(12) United States Patent
Nomura et al.

(10) Patent No.: US 7,234,305 B2
(45) Date of Patent: Jun. 26, 2007

(54) GAS TURBINE CONTROL APPARATUS AND GAS TURBINE SYSTEM USING THE SAME

(75) Inventors: Masumi Nomura, Takasago (JP); Kozo Toyama, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/191,945

(22) Filed: Jul. 29, 2005

(65) Prior Publication Data

US 2005/0262849 A1 Dec. 1, 2005

Related U.S. Application Data

(62) Division of application No. 10/225,356, filed on Aug. 22, 2002, now Pat. No. 6,955,039.

(30) Foreign Application Priority Data

Aug. 23, 2001 (JP) ............................. 2001-253299

(51) Int. Cl.
*F02C 9/00* (2006.01)
(52) U.S. Cl. ...................................................... 60/773
(58) Field of Classification Search ................ 60/39.27, 60/39.281, 725, 773, 794, 795
See application file for complete search history.

(56) References Cited

U.S. PATENT DOCUMENTS

| 5,575,144 A | 11/1996 | Brough |
| 5,791,889 A | 8/1998 | Gemmen et al. |
| 6,205,765 B1 | 3/2001 | Iasillo et al. |
| 6,522,991 B2 | 2/2003 | Banaszuk et al. |

FOREIGN PATENT DOCUMENTS

| JP | 05-187270 | 7/1993 |
| JP | 06-147484 | 5/1994 |
| JP | 9-269107 | 10/1997 |
| JP | 11-324725 | 11/1999 |

*Primary Examiner*—L. J. Casaregola
(74) *Attorney, Agent, or Firm*—Oblon, Spivak, McClelland, Maier & Neustadt, P.C.

(57) ABSTRACT

In a gas turbine control apparatus, a frequency analyzing section frequency-analyzes at least one of pressure oscillation in combustors of a gas turbine and acceleration oscillation of each of the combustors and outputs a first frequency analysis result as the result of frequency analysis for a plurality of predetermined frequency bands. A control unit controls at least one of a first fuel flow rate of fuel and a first air flow rate of air based on the first frequency analysis result for the plurality of frequency bands. The fuel and the air are supplied to the gas turbine.

16 Claims, 13 Drawing Sheets

Fig. 2

| FREQUENCY BAND | THRESHOLD SIGNAL | CORRECTION DATA |
|---|---|---|
| FREQUENCY BAND 1 | $\alpha_1$ | $f_1$ (MW, AIR TEMPERATURE, HUMIDITY, ···) |
| FREQUENCY BAND 2 | $\alpha_2$ | $f_2$ (MW, AIR TEMPERATURE, HUMIDITY, ···) |
| ⋮ | ⋮ | ⋮ |
| FREQUENCY BAND n | $\alpha_n$ | $f_n$ (MW, AIR TEMPERATURE, HUMIDITY, ···) |

Fig. 3

| FREQUENCY BAND | THRESHOLD SIGNAL | CORRECTION DATA |
|---|---|---|
| FREQUENCY BAND 1 | $\alpha_{11}$ | $f_{11}$ (MW, AIR TEMPERATURE, HUMIDITY, ···) |
| | $\alpha_{12}$ | $f_{12}$ (MW, AIR TEMPERATURE, HUMIDITY, ···) |
| FREQUENCY BAND 2 | $\alpha_{21}$ | $f_{21}$ (MW, AIR TEMPERATURE, HUMIDITY, ···) |
| | $\alpha_{22}$ | $f_{22}$ (MW, AIR TEMPERATURE, HUMIDITY, ···) |
| ⋮ | ⋮ | ⋮ |
| FREQUENCY BAND n | $\alpha_{n1}$ | $f_{n1}$ (MW, AIR TEMPERATURE, HUMIDITY, ···) |
| | $\alpha_{n2}$ | $f_{n2}$ (MW, AIR TEMPERATURE, HUMIDITY, ···) |

Fig. 15

| | CONTROL SIGNAL X | | | |
|---|---|---|---|---|
| | FLOW RATE BAND $a_1$ | FLOW RATE BAND $a_2$ | ... | FLOW RATE BAND $a_L$ |
| FREQUENCY BAND 1 | OSCILLATION INTENSITY $A_{11}$ | OSCILLATION INTENSITY $A_{12}$ | ... | OSCILLATION INTENSITY $A_{1L}$ |
| FREQUENCY BAND 2 | OSCILLATION INTENSITY $A_{21}$ | OSCILLATION INTENSITY $A_{22}$ | ... | OSCILLATION INTENSITY $A_{2L}$ |
| ... | ... | ... | ⋱ | ... |
| FREQUENCY BAND n | OSCILLATION INTENSITY $A_{n1}$ | OSCILLATION INTENSITY $A_{n2}$ | ... | OSCILLATION INTENSITY $A_{nL}$ |

GAS TURBINE CONTROL APPARATUS AND GAS TURBINE SYSTEM USING THE SAME

CROSS REFERENCE TO RELATED APPLICATION

This application is a division of application Ser. No. 10/225,356, filed Aug. 22, 2002, now U.S. Pat. No. 6,955,039 the entire contents of which are incorporated herein by reference. The present document also claims priority from Japanese application 2001-253299, filed Aug. 23, 2001.

BACKGROUND OF THE INVENTION

1. Field of the Invention

The present invention relates to an apparatus for controlling a gas turbine and a system with such an apparatus. More particularly, the present invention relates to a control apparatus for controlling combustion oscillations and a system with such a control apparatus.

2. Description of the Related Art

For a conventional gas turbine, flow rates of air and fuel respectively fed to a combustor are determined in advance based on the output power of an electric power generator, and temperature and humidity of ambient air, and the conventional gas turbine is operated by using the determined flow rates. However, there is a possibility that actual flow rates are different from those at the design of the gas turbine or those on test running, because of degradation of a compressor and clogging of a filter. At that time, the combustion stability can be reduced and combustion oscillations will be caused. The combustion oscillations seriously obstruct the operation of gas turbine. Therefore, it is strongly requested to minimize or eliminate the combustion oscillations from the viewpoint of the protection of plant facilities and the operation rate of the facilities. For this purpose, a control system of the gas turbine is adjusted by a skilled engineer several times a year in order to prevent the combustion oscillations and confirm and maintain the combustion stability. However, these works by turn raise the maintenance cost and reduce the operation rate of the gas turbine.

In conjunction with the above description, Japanese Laid Open Patent Application (JP-A-Heisei 9-269107) discloses an apparatus and method for suppressing combustion oscillations of a combustor. In this reference, the combustion oscillation suppressing apparatus is comprised of a combustion oscillation suppressing section. The combustion oscillation suppressing section has a frequency analyzer, a central processing unit, a power amplifier and a controller section. The frequency analyzer frequency-analyzes fluctuations of combustion gas pressure detected by a pressure sensor in the combustor, and the central processing unit achieves the oscillation stability of the combustor based on a frequency band of the pressure fluctuations detected by the frequency analyzer. The power amplifier amplifies an output signal of the central processing unit and the controller section controls a combustion valve by applying the amplified output signal as a valve switch signal. In the suppressing method pays attention to low frequency combustion oscillations. The frequency of combustion oscillations is predicted based on fuel to air ratio when the combustion oscillation has occurred. When a low frequency combustion oscillation has occurred, the fuel to air ratio is varied to suppress the occurrence of low frequency combustion oscillations. Because low frequency combustion oscillations can adversely affect the facility, the facility is protected against damages by suppressing low frequency combustion oscillations.

SUMMARY OF THE INVENTION

Therefore, an object of the present invention to provide a gas turbine control apparatus and a gas turbine system, in which combustion oscillations in a gas turbine can be suppressed and combustion stability of the gas turbine can be improved.

Another object of the present invention is to provide a gas turbine control apparatus and a gas turbine system in which an air pollution level of the combustion in the gas turbine can be reduced.

Still another object of the present invention is to provide a gas turbine control apparatus and a gas turbine system, in which frequencies of combustion oscillations in a gas turbine can be analyzed and combustion oscillations can be properly suppressed in accordance with the result of the analysis.

Yet still another object of the present invention is to provide a gas turbine control apparatus and a gas turbine system, in which combustion stability of a gas turbine can be maintained regardless of change with time of the performance of the gas turbine.

It is another object of the present invention to provide a gas turbine control apparatus and a gas turbine system, in which the reliability of a gas turbine can be improved and the lifetime of the gas turbine can be prolonged, resulting in reducing a maintenance cost.

Another object of the present invention is to provide a gas turbine remote monitoring system, in which the operation of a gas turbine can be remotely monitored to allow any necessary counter measures to extraordinary state to be taken.

Still another object of the present invention is to provide a gas turbine remote monitoring system in which a plurality of gas turbines can centrally monitored from a remote site to improve the operation control efficiency.

In an aspect of the present invention, a gas turbine control apparatus includes a frequency analyzing section and a control unit. The frequency analyzing section frequency-analyzes at least one of pressure oscillation in combustors of a gas turbine and acceleration oscillation of each of the combustors and outputs a first frequency analysis result as the result of frequency analysis for a plurality of predetermined frequency bands. The control unit controls at least one of a first fuel flow rate of fuel and a first air flow rate of air based on the first frequency analysis result for the plurality of frequency bands. The fuel and the air are supplied to the gas turbine.

Here, the control unit may include a control section and a correcting section. The control section outputs process data indicating an operation state of the gas turbine and control signals for controlling the gas turbine. When the first frequency analysis result shows that an intensity of the oscillation exceeds a threshold value in any of the plurality of frequency bands as an abnormal frequency band, the correcting section determines correction data for the abnormal frequency band based on the abnormal frequency band and the process data from the control section and controls at least one of the first fuel flow rate and the first air flow rate based on the determined correction data and the control signals.

In this case, the control unit further may include a data base which stores sets of a second fuel flow rate of fuel, a second air flow rate of air for another gas turbine and a second frequency analysis result for frequency bands for at least one of pressure oscillation in combustors of the another gas turbine and acceleration oscillation of each of the combustors of the another gas turbine. The correcting section determines correction data to the at least one of the first fuel flow rate and the first air flow rate based on at least one of the second fuel flow rate and the second air flow rate for the second frequency analysis result corresponding to the first frequency analysis result. Then, the correcting section controls the at least one of the first fuel flow rate and the first air flow rate based on the determined correction data and the control signals.

Also, the control unit may further include a test run control section which determines test operation conditions different from a current operation condition of the gas turbine, the determined test operation conditions containing test flow rates of the first fuel and air flow rates. The correcting section controls the gas turbine for test operation based on each of the determined test operating conditions. The frequency analyzing section carries out frequency analysis of the at least one of the pressure oscillation in the combustors of the gas turbine and the acceleration oscillation of each of the combustors and outputs the first frequency analysis result for a plurality of frequency bands for the test operation. The test run control section determines an optimal operation condition of the gas turbine based on the process data and the first frequency analysis results in the test runs under the determined test operation conditions such that the intensity of the oscillation reduces.

In the above, the first fuel flow rate may be at least one of a flow rate of main fuel and a flow rate of pilot fuel. Also, the first air flow rate may be at least one of a flow rate of bypassed air of the gas turbine and a flow rate of air adjusted by an inlet guide vane.

In another aspect of the present invention, a gas turbine system may include the above gas turbine control apparatus, and the gas turbine having the combustors.

Also, in another aspect of the present invention, a gas turbine system includes the above gas turbine control apparatus and the gas turbine having the combustors. The correcting section may include first and second correcting sections. The first correcting section determines correction data to the at least one of the first fuel flow rate and the first air flow rate based on at least one of the second fuel flow rate and the second air flow rate for the second frequency analysis result corresponding to the first frequency analysis result. The second correcting section controls the at least one of the first fuel flow rate and the first air flow rate based on the determined correction data and the control signals. The control unit may further include first and second communication sections, and the data base, the first correcting section and the second communication section may be provided in a remote unit apart from the control section, the frequency analyzing section, the second correcting section and the first communication section. The control section transmits the process data to the correcting section of the remote unit via the first and second communication sections. Also, the frequency analyzing section transmits the first frequency analysis result for the plurality of frequency bands to the correcting section of the remote unit via the first and second communication sections. The first correcting section determines the correction data and transmits the determined correction data to the second correcting section via the first and second communication sections. The second correcting section controls the at least one of the first fuel flow rate and the first air flow rate based on the determined correction data from the first correcting section and the control signals from the control section.

Also, in another aspect of the present invention, a gas turbine control method is achieved by receiving measurement data of at least one of pressure oscillations in combustors of a gas turbine and acceleration oscillations of the combustors of the gas turbine; by frequency analyzing the measurement data to produce a frequency analysis result; by dividing the frequency analysis result into a plurality of frequency bands; by determining correction data to at least one of a flow rate of fuel and a flow rate of air to be supplied to the gas turbine based on the frequency analysis result and threshold values for the plurality of frequency bands; and by controlling the gas turbine based on process data indicating an operation state of the gas turbine and the correction data.

A program may be provided for the gas turbine control method.

BRIEF DESCRIPTION OF THE DRAWINGS

FIG. 2 is a table used to determine a correction in the gas turbine control apparatus in the first embodiment;

FIG. 3 is another table used to determine a correction in the gas turbine control apparatus in the first embodiment;

FIG. 15 is a table illustrating relationship of frequencies, correction data and oscillation intensities in a new gas turbine used in the gas turbine control apparatus.

DESCRIPTION OF THE PREFERRED EMBODIMENTS

Hereinafter, a gas turbine control apparatus of the present invention and a gas turbine system of the present invention will be described in detail with reference to the attached drawings.

While the control apparatus of the present invention will be described using a gas turbine as an example, the present invention can be applied to another combustion apparatus that generate combustion oscillations.

Firstly, a gas turbine 2 relating to the gas turbine control apparatus and the gas turbine system of the present invention will be described with reference to FIG. 11.

Figure 11:
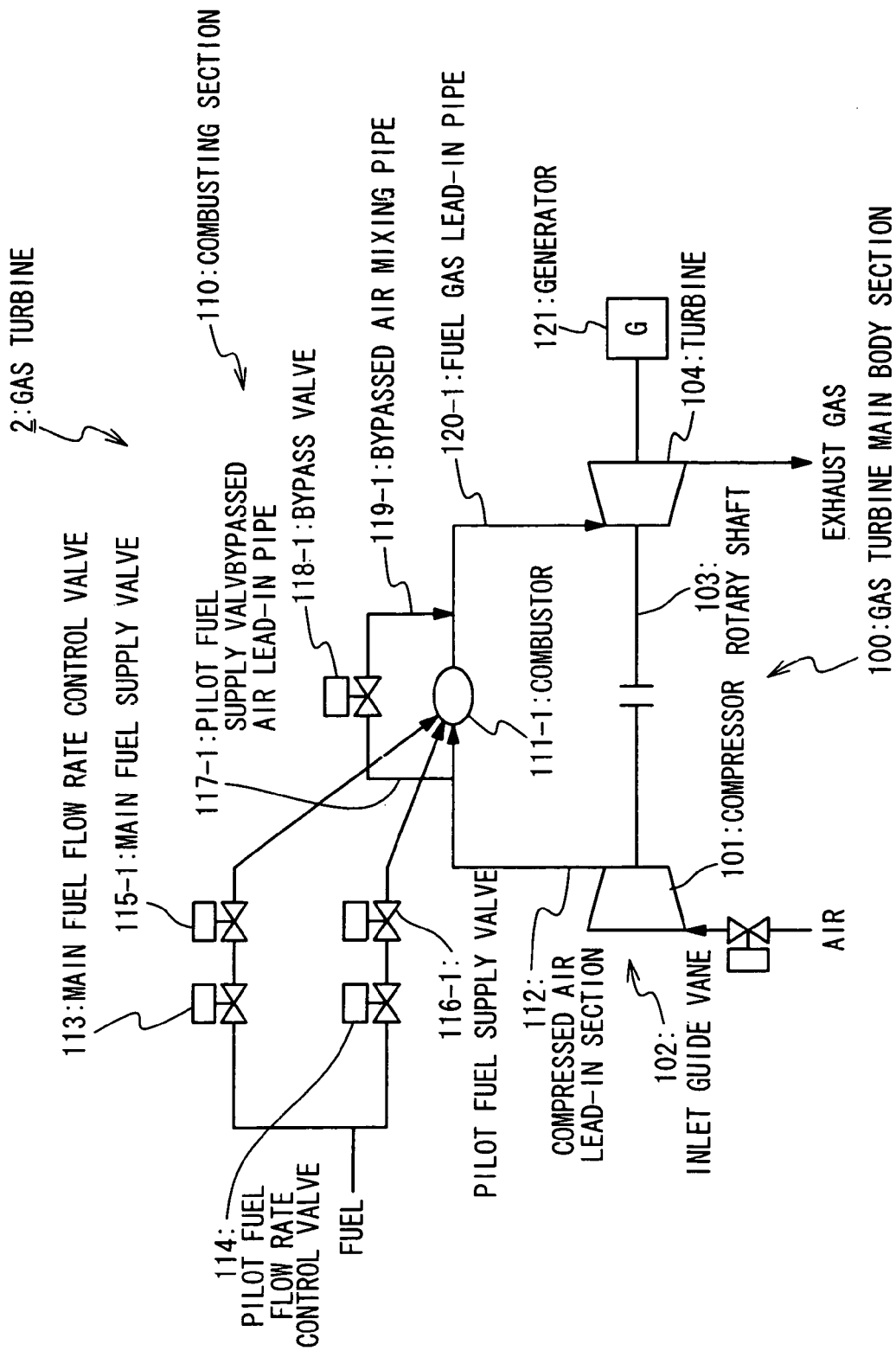
FIG. 11 is a block diagram of the structure of the gas turbine system using the gas turbine control apparatus of the present invention.

FIG. 11 schematically shows the structure of the gas turbine 2. The gas turbine 2 is comprised of a turbine main body 100 and a combustion section 110.

It should be noted that the combustion section 110 has a plurality of combustors or m (m is an integer larger than 1) combustors. In the following description, a reference numeral 111 is used when all the combustors 111-1 to 111-m are commonly denoted, and reference numerals 111-1 to 111-m are used when each of the combustors will be described. Bypassed air lead-in pipes 117, bypass valves 118, bypassed air mixing pipes 119, combustion gas lead-in pipes 120, main fuel supply valves 115 and pilot fuel supply valves 116 associated with the combustors 111 will also be described in a similar manner.

FIG. 11 shows only the first combustor 111-1. Therefore, the description will be mostly limited to the first combustor and its annexes.

The turbine main body 100 is comprised of a compressor 101 having an inlet guide vane 102, a rotary shaft 103 and a turbine 104. The combustion section 110 is comprised of a compressed air lead-in section 112, a bypassed air lead-in pipe 117-1, a bypass valve 118-1, a bypassed air mixing pipe 119-1, a combustion gas lead-in pipe 120-1, a combustor 111-1, a main fuel flow rate control valve 113, a pilot fuel flow rate control valve 114, a main fuel supply valve 115-1 and a pilot fuel supply valve 116-1. The gas turbine 2 is coupled to an electric power generator 121.

Air is introduced from outside, is compressed by the compressor 101 and then is supplied to the combustors 111. On the other hand, part of fuel is supplied to the pilot fuel supply valves 116 of the combustors 111 via the pilot fuel flow rate control valves 114 and then to the combustors 111. The remaining fuel is supplied to the main fuel supply valves 115 of the combustors 111 via the respective main fuel flow rate control valves 113 and then to the combustors 111. The introduced air and fuel are combusted in the combustors 111. Combustion gas produced as a result of the combustion is led to the turbine 104 and used to drive the turbine 104 to rotate. The power generator 121 generates electric power by the rotational energy of the turbine 104.

Now, each of the components of FIG. 11 will be described below.

Firstly, the turbine main body 100 will be described.

The turbine 104 is coupled to the combustion gas lead-in pipes 120 and the pipes for exhausting the combustion gas to outside. The turbine 104 is also coupled to the compressor 101 and the power generator 121 by the rotary shaft 103. The turbine 104 is supplied with the combustion gas from the combustors 111 via the combustion gas lead-in pipes 120. The turbine 104 converts the energy of combustion gas into rotational energy and rotates itself. The power generator 121 and the compressor 101 are forced to rotate due to the rotation of the turbine 104. The combustion gas used for power generation is exhausted to the outside.

The compressor 101 is coupled to pipes for introducing external air and the compressed air lead-in section 112, and also to the turbine 104 and the power generator 121 by the rotary shaft 103. The compressor 101 is driven to rotate as the rotations of the turbine 104 are transmitted thereto. External air is introduced by the rotation motion of the compressor 101. Then, the compressor 101 compresses the introduced air and sends the compressed air to the combustor 111.

The inlet guide vanes 102 are rotary vanes arranged at the air entrance side of the compressor 101. An air flow rate of air introduced into the compressor 101 can be adjusted by controlling the angles of the rotary vanes even if the compressor 101 is rotated at a same frequency. The rotary vanes are controlled by a gas turbine control section 3, to be described hereinafter.

The rotary shaft 103 couples the compressor 101, the turbine 104 and the power generator 121, and transmits the rotary force of the turbine 104 to the compressor 101 and the power generator 121.

The power generator 121 is coupled to the turbine 104 by the rotary shaft 103, and transforms the energy of rotary motion of the turbine 104 into electric power energy.

Now, the combustion section 110 will be described below.

The compressed air lead-in section 112 has a space for introducing air in the lead-in pipes coupled to the compressor 101 and a casing of the combustion section 110, and leads the compressed air ejected from the compressor 101 into the combustor 111-1.

The bypassed air lead-in pipe 117-1 is coupled to the compressed air lead-in section 112 to have an open end and the other end coupled to the bypass valve 118-1. The bypassed air lead-in pipe 117-1 bypasses the air that is not supplied to the combustor 111-1 into the turbine 104.

The bypass valve 118-1 is coupled to the bypassed air lead-in pipe 117-1 at one end and to the bypassed air mixing pipe 119-1 at the other end. The bypass valve 118-1 is used to control a flow rate of air passing through the bypassed air lead-in pipe 117-1 under the control of the gas turbine control section 3 to be described hereinafter.

The bypassed air mixing pipe 119-1 is coupled to the bypass valve 118-1 at one end and to the combustion gas lead-in pipe 120-1 at the other end. The bypassed air mixing pipe 119-1 is used to supply the air that passes through the bypass valve 118-1, to the combustion gas lead-in pipe 120-1 in order to mix it with the combustion gas produced from the combustor 111-1.

The main fuel flow rate control valve 113 is coupled to a pipe for supplying fuel from outside at one end and to a pipe coupled to the plurality of main fuel supply valves 115-1 to m at the other ends. The main fuel flow rate control valve 113 is used to control a flow rate of fuel supplied from outside to the combustors 111 under the control of the gas turbine control section 3 to be described hereinafter. The fuel that passes through the main fuel flow rate control valve 113 is used in main burners of the combustors 111.

The main fuel supply valve 115-1 is coupled to the main flow rate control valve 113 at one end and to a pipe connected to main burner of the combustor 111-1 at the other end. The main fuel supply valve 115-1 is used to control a flow rate of fuel supplied to the main burner of the combustor 111-1 under the control of the gas turbine control section 3, to be described hereinafter.

The pilot fuel flow rate control valve 114 is coupled to a pipe for supplying fuel from outside at one end and to the pipe coupled to the plurality of pilot fuel supply valves 116-1 to 116-m at the other ends. The pilot fuel flow rate control valve 114 is used to control a flow rate of fuel supplied from outside to the combustors 111 under the control of the gas turbine control section 3, to be described hereinafter. The fuel that passes through the pilot fuel flow rate control valve 114 is used in pilot burners of the combustors 111.

The pilot fuel supply valve 116-1 is coupled to the pipe connected to the pilot fuel flow rate control valve 114 at one end and to a pipe connected to the pilot burner of the combustor 111-1 at the other end. The pilot fuel supply valve 116-1 is used to control a flow rate of fuel supplied to the pilot burner of the combustor 111-1 under the control of the gas turbine control section 3, to be described hereinafter.

The combustor 111-1 is coupled to the compressed air lead-in section 112 for supplying air, a pipe connected to the main fuel supply valve 115-1 for supplying fuel, a pipe connected to the pilot fuel supply valve 116-1 for supplying fuel and the combustion gas lead-in pipe 120-1 for sending out combustion gas. The combustor 111-1 receives the air and fuel supplied thereto and combusts them to produce high temperature/high pressure combustion gas. The produced combustion gas is sent toward the turbine 104.

The combustion gas lead-in pipe 120-1 is coupled to the combustor 111-1 at one end and to the turbine 104 at the other end. The combustion gas lead-in pipe 120-1 is coupled to the bypassed air mixing pipe 119-1 on the way. The combustion gas lead-in pipe 120-1 is used to supply the combustion gas and the bypassed air to the turbine 104.

(First Embodiment)

Now, the gas turbine control apparatus according to the first embodiment of the present invention and the gas turbine system with the above gas turbine 2 of the present invention will be described below with reference to the attached drawings.

Figure 1:
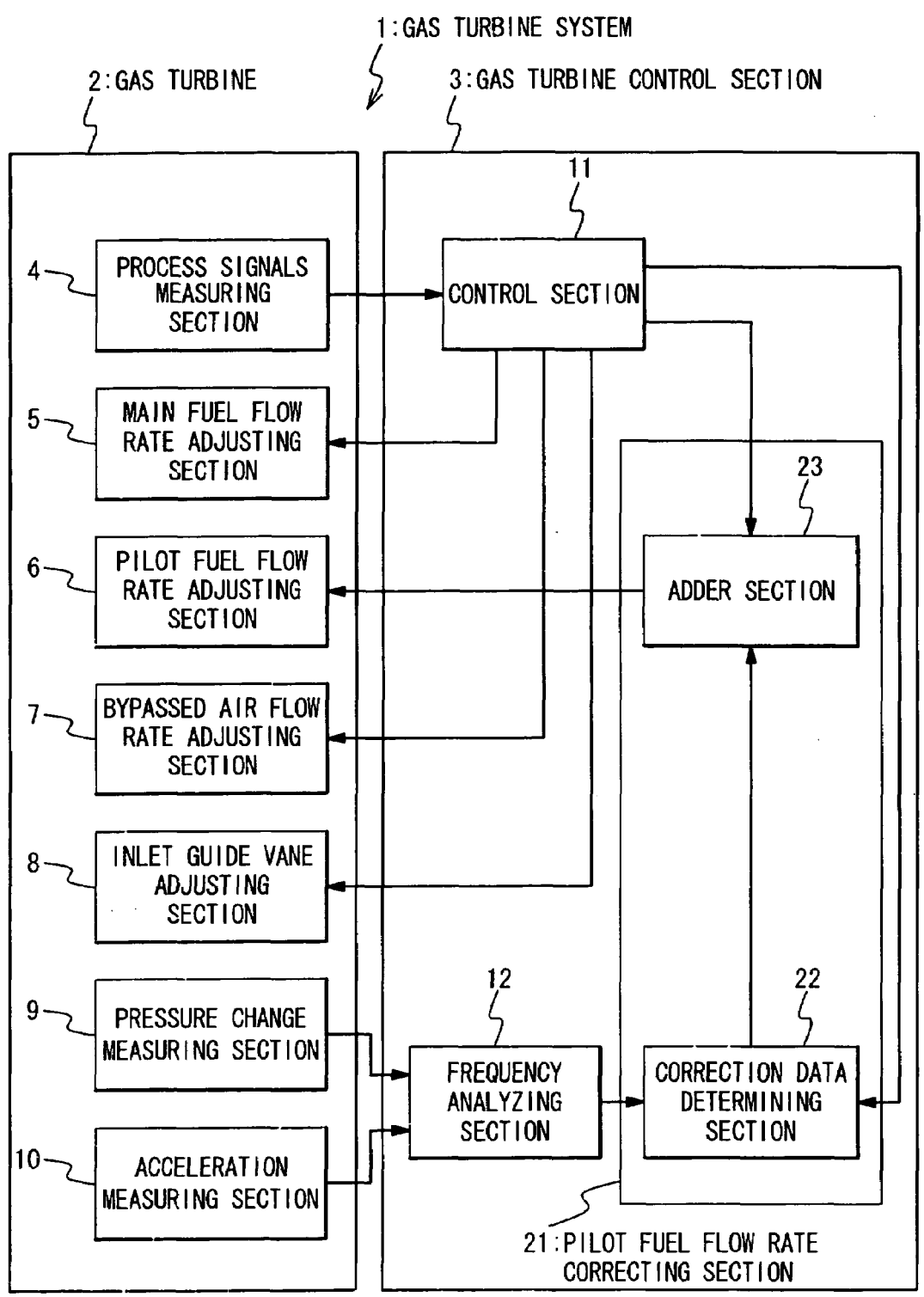
FIG. 1 is a block diagram showing the system configuration of a gas turbine control apparatus according to a first embodiment of the present invention, which is used in a gas turbine system.

FIG. 1 is a block diagram showing the circuit structure of the gas turbine control apparatus of the present invention. The gas turbine system 1 is comprised of a gas turbine 2 and a gas turbine control section 3 as the gas turbine control apparatus of the present invention.

The gas turbine 2 is comprised of a process values measuring section 4, a main fuel flow rate adjusting section 5, a pilot fuel flow rate adjusting section 6, a bypassed air flow rate adjusting section 7, an inlet guide vane adjusting section 8, a pressure change measuring section 9 and an acceleration measuring section 10.

On the other hand, the gas turbine control section 3 is comprised of a control section 11, a frequency analyzing section 12 and a pilot fuel flow rate correcting section 21 having a correcting function. The pilot fuel flow rate correcting section 21 includes a correction data determining section 22 and an adder section 23.

According to the present invention, the gas turbine 2 combusts fuel in the combustors 111 by controlling a main fuel flow rate and a pilot fuel flow rate as the first flow rate, and a bypassed air flow rate and an air flow rate of air passing through the inlet guide vanes as the first air flow rate (the main fuel flow rate adjusting section 5, the pilot fuel flow rate adjusting section 6, the bypassed air flow rate adjusting section 7 and the inlet guide vane adjusting section 8). The generation of electric power is carried out by using the combustion gas. The operating situations of the gas turbine 2 are observed in terms of process values (process values measuring section 4). Additionally, oscillations of pressure and acceleration that arise due to the combustion (the pressure change measuring section 9, the acceleration measuring section 10) are also observed.

On the other hand, according to the present invention, the gas turbine control section 3 controls fuel and air for the operation of the gas turbine 2. The gas turbine control section 3 monitors the operating situation of the gas turbine 2 by observing the process values. Also, the gas turbine control section 3 observes oscillations of pressure and acceleration due to the combustion in the gas turbine 2 and analyzes the oscillations through frequency analysis by the frequency analyzing section 12. In the first embodiment, a corrected value of pilot flow rate is determined by the pilot fuel flow rate correcting section 21 and outputted to the pilot fuel flow rate adjusting section 6 to suppress the oscillations of pressure and acceleration.

More specifically, the gas turbine control section 3 observes combustion oscillations produced in the gas turbine 2 and appropriately controls the operation of the gas turbine 2 in accordance with the frequency characteristics of the observed combustion oscillations, particularly, by changing the pilot fuel flow rate in accordance with the oscillations, so that the combustion oscillations can be suppressed.

Now, the components of FIG. 1 will be described below.

The gas turbine 2 is same as the gas turbine described above with reference to FIG. 11. FIG. 1 shows a block diagram showing the structure of the gas turbine 1.

Referring to FIG. 1, the process values measuring section 4 is comprised of various process values measuring units for observing the process values showing the operation condition and the operation situation of the gas turbine 2. The process values measuring units are arranged on proper positions of the gas turbine 2 and the measuring results are outputted to the control section 11 of the gas turbine control section 3, to be described hereinafter. Here, the process values typically contain generated electric power (electric current and voltage of generated power), temperature and humidity of ambient air, fuel flow rates and fuel pressures in various sections, air flow rates and air pressures in various sections, combustion gas temperatures, combustion gas flow rates and combustion gas pressures in the combustors, the number of rotations per unit time of the compressor and that of the turbine.

The main fuel flow rate adjusting section 5 controls a main fuel flow rate in accordance with a command issued from the control section 11. The main fuel flow rate adjusting section 5 is comprised of the main fuel flow rate control valve 113 and the main fuel supply valves 115-1 to 115-m. The overall flow rate of the main fuel is controlled and adjusted by the main fuel flow rate control valve 113. The flow rates of the main fuel to the combustors 111-1 to 111-m are controlled and adjusted by the respective main fuel supply valves 115-1 to 115-m.

The pilot fuel flow rate adjusting section 6 controls a pilot fuel flow rate in accordance with a command issued from the control section 11. The pilot fuel flow rate adjusting section 6 is comprised of the pilot fuel flow rate control valve 114 and the pilot fuel supply valves 116-1 to 116-m. The overall flow rate of the pilot fuel is controlled and adjusted by the pilot fuel flow rate control valve 114. The flow rates of the pilot fuel to the combustors 111-1 to 111-m are controlled and adjusted by the respective pilot fuel supply valves 116-1 to 116-m.

The bypassed air flow rate adjusting section 7 controls a flow rate of air to be supplied to each of the combustors 111-1 to 111-m in accordance with a command issued from the control section 11. The bypassed air flow rate adjusting section 7 is comprised of the bypassed air lead-in pipes 117-1 to 117-m, the bypass valves 118-1 to 118-m and the bypassed air mixing pipes 119-1 to 119-m. For each of the combustors 111-1 to 111-m, the air flow rate is increased or decreased by increasing or decreasing an opening of the corresponding one of the bypass valves 118-1 to 118-m to increase or decrease the quantity of air supplied to the combustor per unit time.

The inlet guide vane adjusting section 8 controls a flow rate of air introduced into the compressor 101 in accordance with a command issued from the control section 11. More specifically, the flow rate of air introduced into the compressor 101 is adjusted by controlling the angle of the rotary vane 102 of the inlet guide vane 102.

The pressure change measuring section 9 is comprised of pressure measuring units fitted to the respective combustors 111-1 to 111-m. The pressure change measuring section 9 measures pressures in the combustors 111-1 to 111-m in accordance with a command issued from the control section 11 and outputs the measured values of the pressure changes in each of the combustors 111-1 to 111-m to the frequency analyzing section 12 of the gas turbine control section 3.

The acceleration measuring section 10 is comprised of acceleration measuring units fitted to the respective combustors 111-1 to 111-m. The acceleration measuring section 10 measures accelerations of the combustors 111-1 to 111-m (twice differentiation with respect to position) in accordance with a command issued from the control section 11 and outputs the measured value of acceleration in each of the combustors 111-1 to 111-m to the frequency analyzing section 12 of the gas turbine control section 3.

On the other hand, the gas turbine control section 3 controls the gas turbine 2 in accordance with the process values, pressures and accelerations measured in the gas turbine 2 so as to stop the combustion oscillations.

The control section 11 outputs control signals to the main fuel flow rate adjusting section 5, the bypassed air flow rate adjusting section 7 and the inlet guide vane adjusting section 8 in accordance with the process values measured in the gas turbine 2 for control of them. Also, the control section 11 outputs an ordinary control signal for controlling the pilot fuel flow rate adjusting section 6 to the pilot fuel flow rate correcting section 21 (to be described hereinafter) and assists that the pilot fuel flow rate correcting section 21 controls the pilot fuel flow rate adjusting section 6. The controls of the main fuel flow rate adjusting section 5, the bypassed air flow rate adjusting section 7 and the inlet guide vane adjusting section 8 are typically carried out based on a feed forward method, a feed back method or a PID method.

The frequency analyzing section 12 analyzes frequencies of pressure fluctuations or oscillations in each of the combustors 111-1 to 111-m in accordance with the pressure change in the combustor measured by the pressure change measuring section 9. At that time, the frequency analyzing section 12 divides frequencies into a plurality of frequency bands and outputs the result of the frequency analysis for each frequency band. Also, the frequency analyzing section 12 analyzes frequencies of accelerations in each of the combustors 111-1 to 111-m in accordance with the acceleration values measured by the acceleration measuring section 10. At that time, the frequency analyzing section 12 divides frequencies into a plurality of frequency bands and outputs the result of the frequency analysis for each frequency band. The analyzing result to each of the combustors 111-1 to 111-m is transmitted to the pilot fuel flow rate correcting section 21.

The pilot fuel flow rate correcting section 21 calculates a correction data based on the result of the frequency analysis for each frequency band for both pressure and acceleration and the obtained process values. The pilot fuel flow rate correcting section 21 adds the correction data to a value indicated by the control signal from the control section 11 for controlling the pilot fuel flow rate adjusting section 6, and outputs a corrected control signal to the pilot fuel flow rate adjusting section 6. The pilot fuel flow rate correcting section 21 may alternatively be included in the control section 111.

The correction data determining section 22 determines the correction data to be used for correcting the control signal for controlling the pilot fuel flow rate adjusting section 6 based on the result of the frequency analysis of each frequency band for both pressure and acceleration and the process values obtained from the control section 11 with reference to the correction data determining table (see FIGS. 2 and 3 and the description given hereinafter). The determined correction data is outputted to the adder section 23.

The adder section 23 adds the correction data determined by the correction data determining section 22 to the value indicated by the control signal from the control section 11 for controlling the pilot fuel flow rate adjusting section 6 and outputs the corrected control signal to the pilot fuel flow rate adjusting section 6 as control signal for controlling the latter.

Now, the operation of the gas turbine control apparatus and the gas turbine system in the first embodiment will be described with reference to the drawings.

Firstly, a method of determining the correction elementary data used for the control of the operation of the gas turbine will be described.

Figure 14:
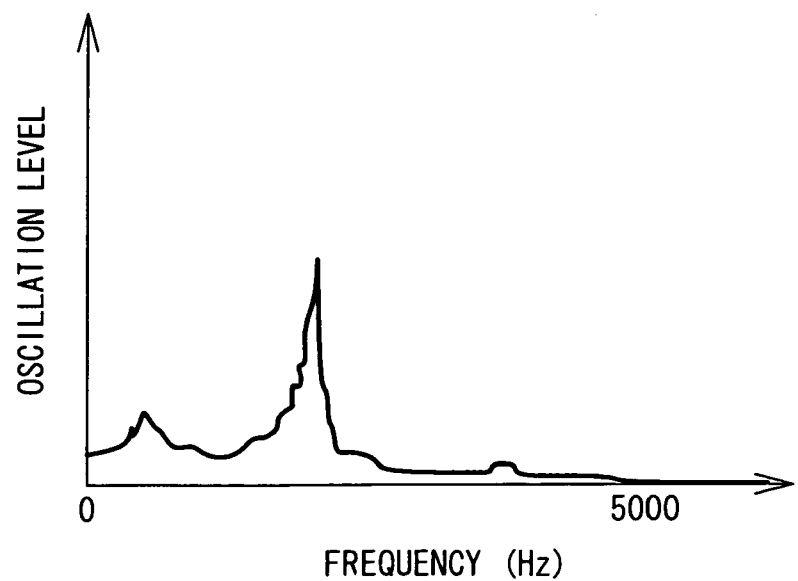
FIG. 14 is a graph illustrating the frequency analyzing result of combustion oscillations by the gas turbine control apparatus of the present invention.

FIG. 14 is a graph illustrating a result of a frequency analysis conducted by the frequency analyzing section 12 based on the measured values of pressure fluctuations measured by the pressure change measuring section 9. The horizontal axis and the vertical axis of the graph respectively represent the frequency and the intensity (level) of oscillations. It could be seen from FIG. 14 that the frequency of combustion oscillations, i.e., pressure oscillations and acceleration oscillations generated in the combustors 111 varies over a wide range. Therefore, the combustion oscillations need to be suppressed by suppressing oscillations of different frequencies.

Since the oscillation of each frequency is caused by complex factors, the oscillation cannot be suppressed by a uniform control process and/or by controlling a single parameter. Additionally, the influence of oscillation can vary depending on the frequency of oscillation. Therefore, while the oscillation showing an intensity may be allowable for a frequency band, the oscillation can be fatal to some other frequency bands. For these reasons, the operation condition of the gas turbine 2 should be controlled based on a plurality of parameters depending on the frequencies of oscillation.

Therefore, for the purpose of the present invention, correction data (see the table in FIG. 2) are firstly prepared in a manner as described below.

The table shown in FIG. 2 includes items of frequency band, threshold value and correction data. Each of the items will be described below.

(1) Frequency band: Frequency bands provide the smallest unit for the measures to be taken based on frequency analysis.

Firstly, a frequency range in which oscillations of pressure and acceleration are measured is defined. For instance, since oscillations mainly occur in a frequency band of 0 to 5,000 Hz in FIG. 14, a frequency range between 0 and 5,000 Hz may be defined. Then, the frequency range is divided into frequency bands of an appropriate size. In other words, the frequency range is divided by n (n is an integer greater than 0). If the frequency range is divided into frequency bands of 50 Hz, n=100 will be obtained. Note that the frequency bands do not necessarily have to have a same size.

(2) Threshold value: The highest oscillation intensity that can be permitted for each frequency band.

The threshold values ($\alpha_1$ through $\alpha_n$) are defined for each of the pressure oscillation and the acceleration oscillation for each of the oscillation bands (frequency bands 1 to n). The threshold value is determined based on whether there are members and/or structures that resonate with the oscillation with the frequency, whether there are members and/or structures that are apt to be damaged by the oscillation of the frequency, to which extent each of such members and/or structures can withstand and so on.

Note that the threshold values are not always same for the frequency bands.

(3) correction data: A control signal representing the correction data is added to the ordinary control signal from the control section 11 in order to reduce the oscillation of each frequency band below a permissible level.

A correction data is determined as a function of the process values for each of the frequency bands 1 to n based on the process values (e.g., generated electric power, temperature and humidity of ambient air, fuel flow rates and fuel pressures in various sections, air flow rates and air pressures in various sections, combustion gas temperature, combustion gas flow rates and combustion gas pressures in the combustors, the number of rotations per unit time of the compressor and that of the turbine, etc.). In other words, functions $f_1$ to $f_n$ (the process values: generated electric power, temperature and moisture of ambient air, etc.) of correction data are provided for the frequency bands 1 to n, and the calculating result of the functions are used as correction data. Since the influence on the gas turbine differs depending on the frequency band, the functions $f_1$ through $f_n$ are not necessarily same for all the frequency bands. Accordingly, the types of process values used for the functions are not necessarily same.

The functions $f_1$ through $f_n$ are changed depending on the structure of the gas turbine 2, the materials used for the gas turbine 2, and the operation condition of the gas turbine 2. Therefore, the functions $f_1$ through $f_n$ are defined for each gas turbine based on the data for the design (structure, and materials), those obtained during a test run and those obtained from the past gas turbines of the same type and so on.

It should be noted that it is not necessary to use a single threshold value for each of the frequency bands 1 to n. In other words, a plurality of threshold values may be provided for any of the frequency bands and a critical level is defined for each threshold value. The operation of the control section 11 is changed depending on the critical level, and the operation condition may be adjusted gradually depending on the level of the threshold value to alleviate the workload of the gas turbine 2. For example, a case where two threshold values are provided and critical levels are set will be described. In this case, a relatively small correction data is used for the first threshold value (the critical level 1), whereas a relatively large correction data is used for the second threshold value (the critical level 2) and an alarm is issued when the second threshold value is reached.

FIG. 3 shows a table that can be used for such an example. Referring to FIG. 3, two threshold values are provided for each of the frequency bands 1 to n. For example, threshold values $\alpha_{11}$ and $\alpha_{12}$ are provided for the frequency band 1 and correction data $f_{11}$ (process value) and $\alpha_{12}$ (process value) are provided for the threshold values, respectively. Thus, even if the intensity of oscillation is increased, the oscillation can be suppressed without abruptly varying the operation condition. Therefore, oscillations can be suppressed without subjecting the gas turbine 2 to a large load.

It should be noted that data as shown in FIGS. 2 and 3 may be prepared for each of the sections to be controlled (the main fuel flow rate adjusting section 5, the pilot fuel flow rate adjusting section 6, the bypassed air flow rate adjusting section 7, the inlet guide vane adjusting section 8) and the components such as valves. In the first embodiment, a table is prepared for the pilot fuel flow rate adjusting section 6.

Only data on pressure oscillations or on acceleration oscillations may be used for preparing a table or data on both pressure oscillations and acceleration oscillations may be used for preparing a table as shown in FIG. 2 or FIG. 3.

Now the process of controlling the pilot fuel flow rate by determining a correction data on the operation of the gas turbine 2 will be described with reference to FIGS. 1, 2 and 12.

(1) Before starting an operation of the gas turbine system (the start step in FIG. 12), data illustrated in FIG. 2 or FIG. 3 are prepared in a manner as described above. The data are stored in a storage section (not shown) of the pilot fuel flow rate correcting section 21.

(2) Then, during the actual operation of the gas turbine 2, the pressure change measuring section 9 and the acceleration measuring section 10 respectively measure a pressure change of combustion gas in each of the combustors 111-1 to 111-m and an acceleration of each of the combustors 111-1 to 111-m. The measured data are outputted to the frequency analyzing section 12 for every predetermined time. The measured data are received by the frequency analyzing section 12 of the gas turbine control section 3 (Step S1 in FIG. 12).

(3) The frequency analyzing section 12 of the gas turbine control section 3 performs frequency analyzing operations on the measured data by using Fourier analysis to obtain data showing the relation of the frequency and the intensity (level) of oscillation as shown in FIG. 14. Thereafter, the frequency—oscillation data are assigned to predefined frequency bands (Step S2 in FIG. 12). The obtained results are then outputted to the correction data determining section 22 of the pilot fuel flow rate correcting section 21.

(4) The correction data determining section 22 of the gas turbine control section 3 compares the result obtained for each of the frequency bands 1 to n obtained by the frequency analyzing section 12 with the threshold value $\alpha$ of a corresponding frequency band listed in the table shown in FIG. 2 or 3 that is stored in the storage section (not shown). If the intensity of oscillation does not exceed the threshold value $\alpha$, a correction data of 0 is selected. On the other hand, if the intensity of oscillation exceeds the threshold value $\alpha$ of the corresponding frequency band (which will be referred to as abnormal frequency band hereinafter), a calculating operation of the function f is performed by using the process values outputted from control section 11 to determine a correction data (Step S3 in FIG. 12). The determined correction data is outputted to the adder section 23.

Figure 12:
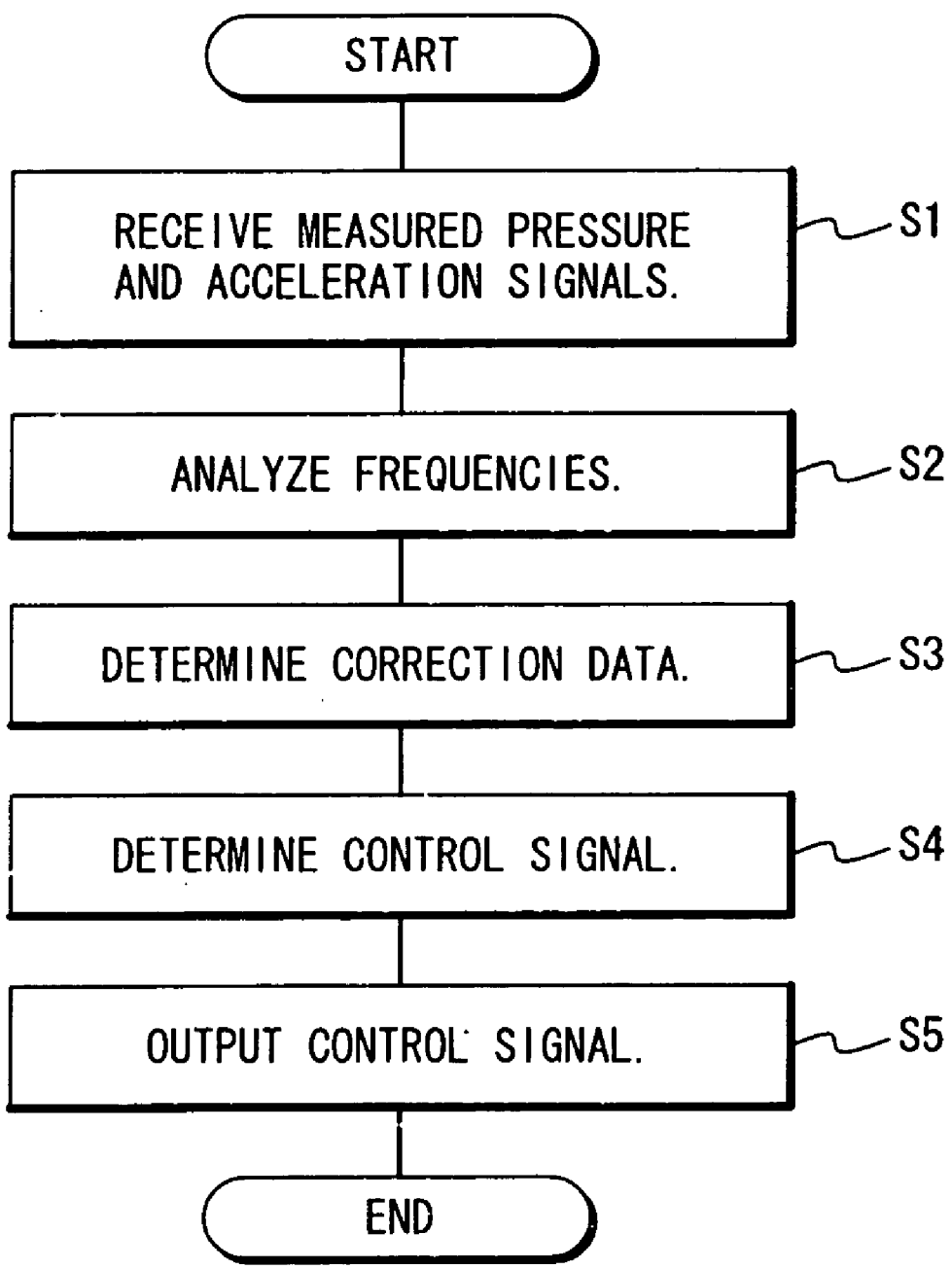
FIG. 12 is a flow chart showing an operation of the gas turbine control apparatus of the present invention.

(5) The adder section 23 of the gas turbine control section 3 adds a signal corresponding to the correction data outputted from the correction data determining section 22 to the control signal for controlling the pilot fuel flow rate adjusting section 6 outputted from the control section 11 to define a new control signal for controlling the pilot fuel flow rate adjusting section 6 (Step S4 in FIG. 12).

(6) The gas turbine control section 3 outputs the newly defined control signal for controlling the pilot fuel flow rate adjusting section 6 to the latter (Step S5 in FIG. 12).

(7) The pilot fuel flow rate adjusting section 6 operates the pilot fuel supply valves 116-1 to 116-m or the pilot fuel flow rate control valve 114 in accordance with the control signal outputted from the adder section 23.

It should be noted that the above steps of (1) through (7) are carried out continuously for each predetermined time during the operation of the gas turbine 2.

Figure 13:
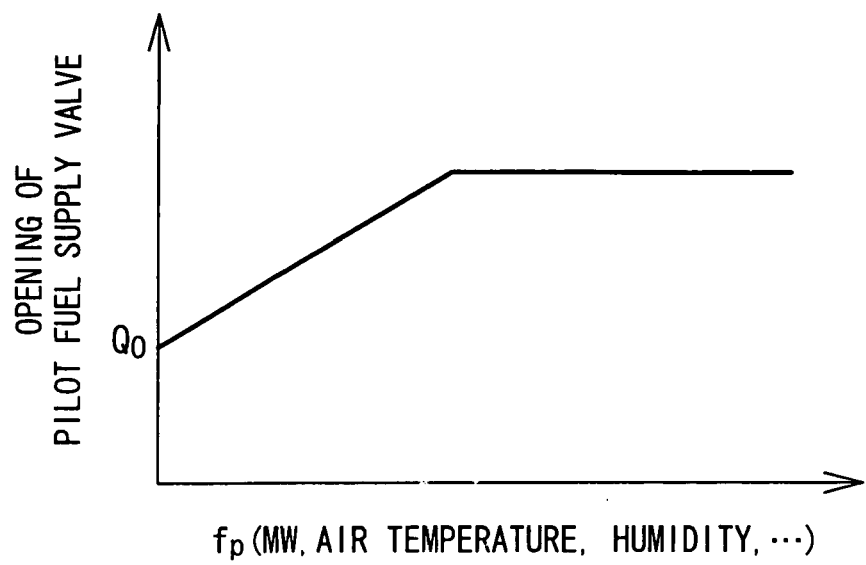
FIG. 13 is a graph showing a function for calculating correction data in the gas turbine control apparatus of the present invention.

FIG. 13 shows a graph showing as an example how the output of the adder section 23 is used for controlling the gas turbine. The graph shows the relationship between the correction data $f_p$ (process values) and the opening of one of the pilot fuel supply valve. In FIG. 13, the vertical axis indicates the opening of the pilot fuel supply valve 116 and the horizontal axis indicates the correction data $f_p$ (process values: MW, temperature of ambient air, . . . ). $Q_0$ in FIG. 13 shows the opening of the pilot fuel supply valve 116 when the correction data is 0. Then, the opening of the pilot fuel supply valve 116 is corrected by using the correction data $f_p$. It would be seen that the correction data $f_p$ varies depending on the process values.

While the opening of the valve is increased by the correction data $f_p$ (process values) in FIG. 13, it is not necessarily always so. It may conversely be decreased depending on the configuration of the apparatus and/or the frequency band.

Also, the main fuel flow rate, the bypassed air flow rate, the quantity of air introduced by the inlet guide vanes are also controlled based on feed forward control, feed back control or PID control so as to set to respective predetermined values.

In this way, in the present invention, a pilot fuel flow rate is controlled as a function of the pressure oscillations and the acceleration oscillations measured in the gas turbine 2 so as to optimally suppress the pressure oscillations and the acceleration oscillations. Specifically, in the present invention, the generated oscillations are analyzed by dividing a frequency range into frequency bands and an appropriate corrective value is determined for each frequency band. Therefore, the efficiency of operation of the gas turbine and the stability of combustion can be improved remarkably.

(Embodiment 2)

Now, gas turbine control apparatus for the gas turbine 2 and the gas turbine system using the control apparatus and the gas turbine 2 according to the second embodiment of the present invention will be described below with reference to the attached drawings.

Figure 4:
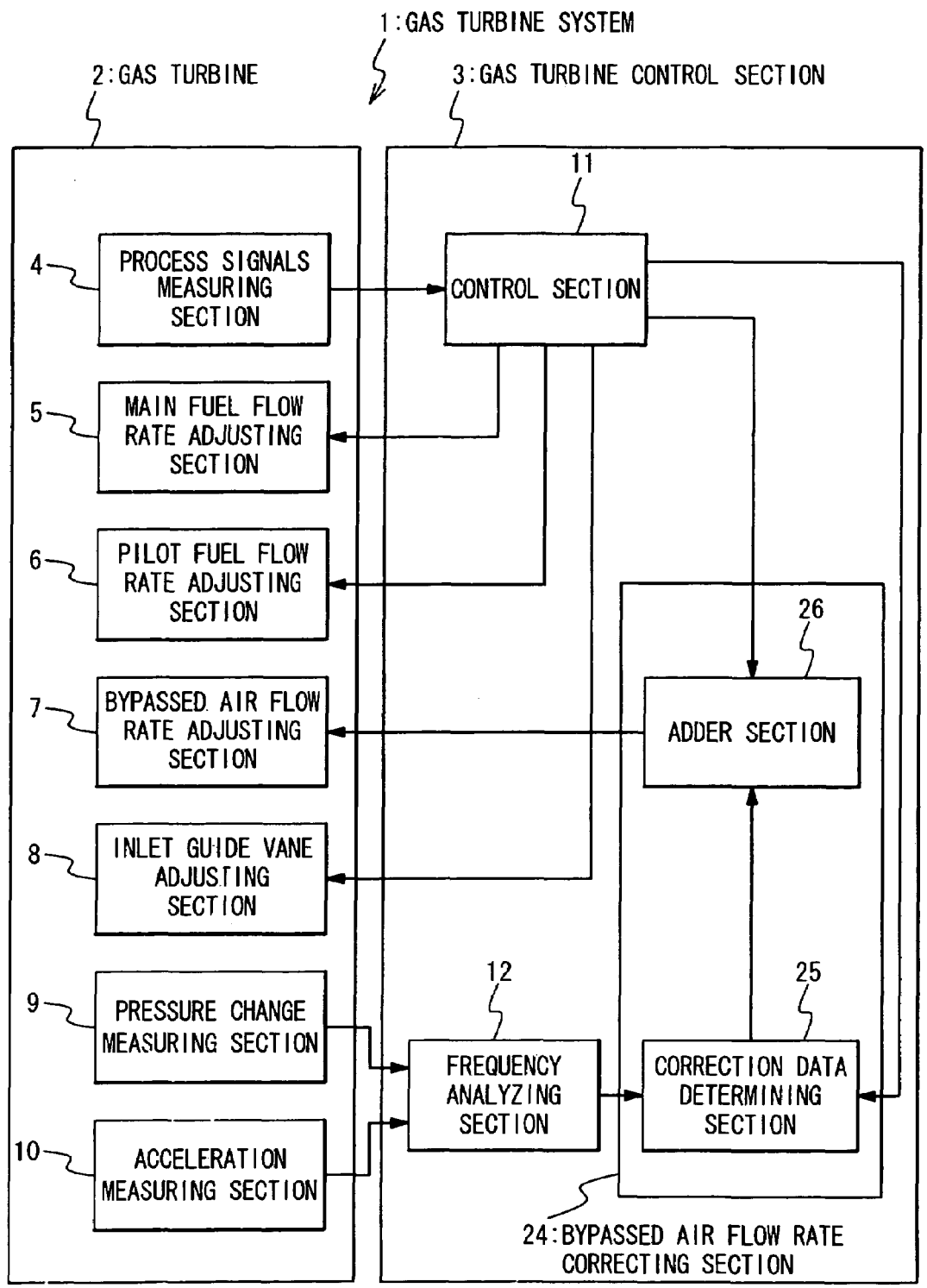
FIG. 4 is a block diagram showing the gas turbine control apparatus according to a second embodiment of the present invention, which is used in a gas turbine system.

FIG. 4 is a schematic block diagram showing the structure of the gas turbine control apparatus and the gas turbine system according to the second embodiment of the present invention. The gas turbine system 1 is comprised of the gas turbine 2 and the gas turbine control section 3 as the gas turbine control apparatus of the present invention.

The gas turbine 2 is comprised of the process values measuring section 4, the main fuel flow rate adjusting section 5, the pilot fuel flow rate adjusting section 6, the bypassed air flow rate adjusting section 7, the inlet guide vane adjusting section 8, the pressure change measuring section 9 and the acceleration measuring section 10.

On the other hand, the gas turbine control section 3 is comprised of the control section 11, the frequency analyzing section 12 and a bypassed air flow rate correcting section 24 having correcting functions. The bypassed air flow rate correcting section 24 includes a correction data determining section 25 and an adder section 26.

The second embodiment of the present invention differs from the first embodiment in that a correction data is applied not to a pilot fuel flow rate but to a bypassed air flow rate in response to oscillations of pressure and acceleration of the gas turbine 2. More specifically, the oscillations of pressure and acceleration produced by combustion are measured and subjected to frequency analysis by the frequency analyzing section 12. Thus, the correction data to be used to adjust a flow rate of bypassed air is determined by the bypassed air flow rate correcting section 24 and outputted to the bypassed air flow rate adjusting section 7 for the purpose of suppressing the pressure oscillation.

More specifically, the gas turbine control section 3 measures combustion oscillations produced in the gas turbine 2 and appropriately controls the operation of the gas turbine 2 in accordance with the frequency characteristics of the measured combustion oscillations, particularly by changing the bypassed air flow rate in accordance with the oscillations in the second embodiment, so that it can suppress combustion oscillations.

Now, the components of FIG. 4 will be described below.

The gas turbine 2 is same as the gas turbine described in the first embodiment and hence will not be described here any further.

On the other hand, the gas turbine control section 3 controls the gas turbine 2 in accordance with the data on the process values, the pressures and the accelerations measured in the gas turbine 2 so as to stop combustion oscillations.

The control section 11 outputs control signals to the main fuel flow rate adjusting section 5, the pilot fuel flow rate adjusting section 6 and the inlet guide vane adjusting section 8 in accordance with the data on the process values measured in the gas turbine 2 for control of them. Also, the control section 11 outputs an ordinary signal for controlling the bypassed air flow rate adjusting section 7 to the bypassed air flow rate correcting section 24 (to be described hereinafter) and assists that the bypassed air flow rate correcting section 24 controls the bypassed air flow rate adjusting section 7. The main fuel flow rate adjusting section 5, the pilot fuel flow rate adjusting section 6 and the inlet guide vane adjusting section 8 are controlled typically by the feed forward method, the feed back method or the PID method.

The frequency analyzing section 12 operates just like that of the first embodiment except that it outputs the result of analysis of each of the combustors to the bypassed air flow rate correcting section 24.

The bypassed air flow rate correcting section 24 calculates a correction data based on the result of the frequency analysis of each frequency band based on both pressure and acceleration and the obtained process values. Then, a signal indicative of the correction data is added to the control signal from the control section 11 for controlling the bypass air flow rate adjusting section 7, and a corrected control signal is outputted to the bypassed air flow rate adjusting section 7. The bypassed air flow rate correcting section 24 may alternatively be included in the control section 11.

The correction data determining section 25 determines the correction data to be used for correcting the control signal for controlling the bypassed air flow rate adjusting section 7 based on the result of the frequency analysis of each frequency band for both pressure and acceleration from the frequency analyzing section 12 and the process values obtained from the control section 11 with reference to the correction data determining table (see FIGS. 2 and 3). The determined correction data is outputted to the adder section 26.

The adder section 26 adds the signal indicative of the correction data determined by the correction data determining section 25 to the control signal from the control section 11 for controlling the bypassed air flow rate adjusting section 7 and outputs the corrected control signal to the bypassed air flow rate adjusting section 7 as a control signal for controlling the latter.

Now, the operation of the gas turbine control apparatus and the gas turbine system of the present invention will be described with reference to the drawings.

Here, the method of determining the correction data such as those shown in FIGS. 2 and 3 to be used for controlling the gas turbine on operation is same as that of the first embodiment and hence will not be described here any further.

It should be noted that data shown in FIGS. 2 and 3 are prepared for each of the sections to be controlled (the main fuel flow rate adjusting section 5, the pilot fuel flow rate adjusting section 6, the bypassed air flow rate adjusting section 7, the inlet guide vane adjusting section 8) and the components (valves). In the second embodiment, a table is prepared for the bypassed air flow rate adjusting section 7.

Only data on pressure oscillations or on acceleration oscillations may be used for preparing a table for each of the related sections or data on both pressure oscillations and acceleration oscillations may be used for preparing a table as shown in FIG. 2 or FIG. 3.

Now, the process of controlling the bypassed air flow rate by determining a correction data for the operation of the gas turbine 2 will be described with reference to FIGS. 4, 2 and 12.

(1) Before starting an operation (the start step in FIG. 12), data shown in FIG. 2 (or FIG. 3) are prepared in a manner as described above. The data are stored in a storage section (not shown) of the bypassed air flow rate correcting section 24.

(2) Then, during the actual operation of the gas turbine 2, the pressure change measuring section 9 and the acceleration measuring section 10 respectively measure the pressure change of combustion gas in each of the combustors 111-1 to 111-m and the acceleration of each of the combustors 111-1 to 111-m. The measured data are outputted to the frequency analyzing section 12 for each predetermined time. The measured data are received by the frequency analyzing section 12 of the gas turbine control section 3 (Step S1 in FIG. 12).

(3) The frequency analyzing section 12 of the gas turbine control section 3 performs the frequency analyzing operation on the measured data typically by Fourier analysis to obtain the relationship between the frequency and the intensity (level) of oscillation as shown in FIG. 14. Thereafter, the frequency—intensity data of the frequency range is divided into predefined frequency bands (Step S2 in FIG. 12). The obtained results are then outputted to the correction data determining section 25 of the bypassed air flow rate correcting section 24.

(4) The correction data determining section 25 of the gas turbine control section 3 compares the result obtained for each of the frequency bands 1 to n obtained by the frequency analyzing section 12 with the threshold value α of the corresponding frequency band listed in the table shown in FIG. 2 or 3 that is stored in the storage section (not shown). If the intensity of oscillation does not exceed the threshold value α, a correction data of 0 is selected.

On the other hand, if the intensity of oscillation exceeds the threshold value α (of the corresponding frequency band, to be referred to as abnormal frequency band hereinafter), a calculating operation of the function f is performed by using the process values outputted from control section 11 to determine correction data (Step S3 in FIG. 12). The determined correction data is outputted to the adder section 26.

(5) The adder section 26 of the gas turbine control section 3 adds a signal indicative of the correction data outputted from the correction data determining section 25 to the control signal for controlling the bypassed air flow rate adjusting section 7 outputted from the control section 11 to define a new control signal for controlling the bypassed air flow rate adjusting section 7 (Step S4 in FIG. 12).

(6) The gas turbine control section 3 outputs the newly defined control signal for controlling the bypassed air flow rate adjusting section 7 to the latter (Step S5 in FIG. 12).

(7) The bypassed air flow rate adjusting section 7 operates the appropriate one or more of the bypass valves 118-1 to 118-m in accordance with the control signal outputted from the adder section 26.

It should be noted that the above steps of (1) through (7) above are carried out repeatedly for each predetermined time during the operation of the gas turbine 2.

Also, the main fuel flow rate, the pilot fuel flow rate, the volume of air introduced by the inlet guide vane are also controlled by feed forward control, feed back control or PID control so as to set them to predetermined values.

In this way, according to the present invention, a bypassed air flow rate is controlled as a function of the pressure oscillations and the acceleration oscillations measured in the gas turbine 2 so as to optimally suppress the pressure oscillations and the acceleration oscillations. Specifically, in the present invention, the generated oscillation is analyzed by dividing frequencies into frequency bands, and appropriate correction measures are taken for each frequency band. Therefore, the efficiency of operation of the gas turbine and the stability of combustion can be improved remarkably.

(Embodiment 3)

Now, the gas turbine control apparatus for the gas turbine 2 and the gas turbine system containing the control apparatus according to the third embodiment of the present invention will be described below with reference to the attached drawings.

Figure 5:
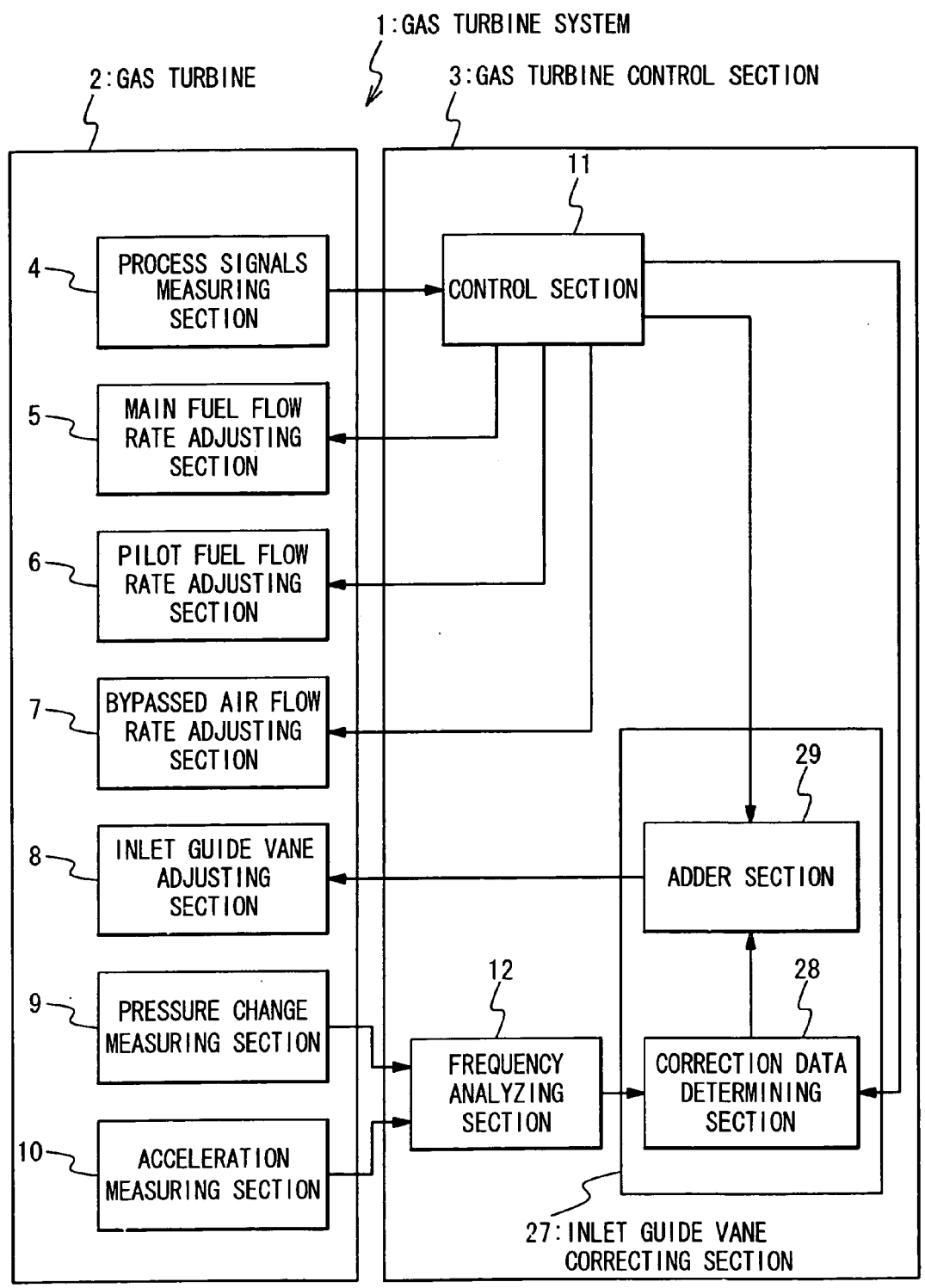
FIG. 5 is a block diagram showing the gas turbine control apparatus according to a third embodiment of the present invention which is used in a gas turbine system.

FIG. 5 is a schematic block diagram showing the structure of the gas turbine control apparatus and the gas turbine system according to the third embodiment of the present invention. The gas turbine system 1 is comprised of the gas turbine 2 and the gas turbine control section 3 as the gas turbine control apparatus of the present invention.

The gas turbine 2 is comprised of the process values measuring section 4, the main fuel flow rate adjusting section 5, the pilot fuel flow rate adjusting section 6, the bypassed air flow rate adjusting section 7, the inlet guide vane adjusting section 8, the pressure change measuring section 9 and the acceleration measuring section 10.

On the other hand, the gas turbine control section 3 is comprised of the control section 11, the frequency analyzing section 12 and an inlet guide vane correcting section 27. The inlet guide vane correcting section 27 includes a correction data determining section 28 and an adder section 29.

The third embodiment of the present invention differs from the first and second embodiments in that correction data are applied neither to a pilot fuel flow rate nor to a bypassed air flow rate but to the control of the inlet guide vanes 102, i.e., the control of air introduced into the compressor 101 in response to oscillations of pressure and acceleration of the gas turbine 2. More specifically, the oscillations of pressure and acceleration produced by combustion are measured and subjected to frequency analysis by the frequency analyzing section 12. Then, correction data used to control the inlet guide vanes 102 and a flow rate of air to be introduced into the compressor 101 is determined by the inlet guide vane correcting section 27 and outputted to the inlet guide vane adjusting section 8 for the purpose of suppressing the pressure oscillation.

More specifically, the gas turbine control section 3 measures combustion oscillations produced in the gas turbine 2, and appropriately controls the operation of the gas turbine 2 in accordance with the frequency characteristics of the measured combustion oscillations, particularly by changing the bypassed air flow rate in accordance with the oscillations in the third embodiment. Thus, the combustion oscillations can be suppressed.

Now, the components of FIG. 5 will be described below.

The gas turbine 2 is same as the gas turbine described above for the first embodiment and hence will not be described here any further.

On the other hand, the gas turbine control section 3 controls the gas turbine 2 in accordance with the data on the process values, the pressures and the accelerations measured in the gas turbine 2 so as to stop combustion oscillations.

The control section 11 outputs control signals to the main fuel flow rate adjusting section 5, the pilot fuel flow rate adjusting section 6 and the bypassed air flow rate adjusting section 7 in accordance with the process values measured in the gas turbine 2. Also, the control section 11 outputs an ordinary signal for controlling the inlet guide vane 8 to the inlet guide vane correcting section 27 (to be described hereinafter) and assists that the inlet guide vane correcting section 27 controls the inlet guide vane adjusting section 8. The main fuel flow rate adjusting section 5, the pilot fuel flow rate adjusting section 6 and the bypassed air flow rate adjusting section 7 are controlled typically by the feed forward method, the feed back method or the PID method.

The frequency analyzing section 12 operates just like that of the first embodiment except that it outputs the result of analysis of each of the combustors to the inlet guide vane correcting section 27.

The inlet guide vane correcting section 27 calculates correction data based on the result of the frequency analysis of each frequency band for both pressure and acceleration and the obtained process values. Then, the inlet guide vane correcting section 27 adds a signal indicative of the correction data to the control signal from the control section 11 for controlling the inlet guide vane adjusting section 8 and outputs a corrected control signal to the inlet guide vane adjusting section 8. The inlet guide vane correcting section 27 may alternatively be included in the control section 11.

The correction data determining section 28 determines correction data to be used for correcting the control signal for controlling the inlet guide vane adjusting section 8 based on the result of the frequency analysis of each frequency band for both pressure and acceleration and the process values obtained from the control section 11 with reference to the correction data determining table (see FIGS. 2 and 3). The determined correction data is outputted to the adder section 29.

The adder section 29 adds the signal indicative of the correction data determined by the correction data determining section 28 to the control signal from the control section 11 for controlling the inlet guide vane adjusting section 8 and outputs the corrected control signal to the inlet guide vane adjusting section 8 as a control signal for controlling the latter.

Now, the operation of the gas turbine control apparatus and the gas turbine system according to the third embodiment of the present invention will be described with reference to the drawings.

Here, the method of determining the correction data such as those shown in FIGS. 2 and 3 to be used for controlling the gas turbine on operation is same as that of the first embodiment and hence will not be described any further.

It should be noted that data shown in FIGS. 2 and 3 are prepared for each of the sections to be controlled (the main fuel flow rate adjusting section 5, the pilot fuel flow rate adjusting section 6, the bypassed air flow rate adjusting section 7, the inlet guide vane adjusting section 8) and the components (valves). In the third embodiment, a table is prepared for the inlet guide vane adjusting section 8.

Only data on pressure oscillations or on acceleration oscillations may be used for preparing a table for each of the related sections or data on both pressure oscillations and acceleration oscillations may be used for preparing a table as shown in FIG. 2 or FIG. 3.

Now the process of controlling inlet guide vane by determining a correction data for the operation of the gas turbine 2 will be described with reference to FIGS. 5, 2 and 12.

(1) Before starting an operation (the start step in FIG. 13), data shown in FIG. 2 or FIG. 3 are prepared in a manner as described above. The data are stored in a storage section (not shown) of the inlet guide vane correcting section 27.

(2) Then, during the actual operation of the gas turbine 2, the pressure change measuring section 9 and the acceleration measuring section 10 respectively measure the pressure change of combustion gas in each of the combustors 111-1 to 111-m and the acceleration of each of the combustors 111-1 to 111-m. The measured data are outputted to the frequency analyzing section 12 for each predetermined time. The measured data are received by the frequency analyzing section 12 of the gas turbine control section 3 (Step S1 in FIG. 12).

(3) The frequency analyzing section 12 of the gas turbine control section 3 performs a frequency analyzing operation on the measured values typically by Fourier analysis to obtain data indicating the relationship between the frequency and the intensity (level) of oscillation as shown in FIG. 14. Thereafter, the frequency—intensity data are assigned to the predefined frequency bands (Step S2 in FIG. 12). The obtained results are then outputted to the correction data determining section 28 of the inlet guide vane correcting section 27.

(4) The correction data determining section 28 of the gas turbine control section 3 compares the result obtained for each of the frequency bands 1 to n obtained by the frequency analyzing section 12 with the threshold value α of the corresponding frequency band listed in the table shown in FIG. 2 or 3 that is stored in the storage section (not shown). If the intensity of oscillation does not exceed the threshold value α, a correction data of 0 is selected. On the other hand, if the intensity of oscillation exceeds the threshold value α of the corresponding frequency band (to be referred to as abnormal frequency band hereinafter), a calculating operation of the function is performed by using the process values outputted from control section 11 to determine the correction data (Step S3 in FIG. 12). The determined correction data is outputted to the adder section 29.

(5) The adder section 29 of the gas turbine control section 3 adds the correction data outputted from the correction data determining section 28 to the control signal for controlling the inlet guide vane adjusting section 8 outputted from the control section 11 to define a new control signal for controlling the inlet guide vane adjusting section 8 (Step S4 in FIG. 12).

(6) The gas turbine control section 3 outputs the newly defined control signal for controlling the inlet guide vane adjusting section 8 to the latter (Step S5 in FIG. 12).

(7) The inlet guide vane adjusting section 8 operates the inlet guide vane in accordance with the control signal outputted from the adder section 29 during the operation of the gas turbine 2.

It should be noted that the above steps of (1) through (7) above are carried out repeatedly for each predetermined time.

The main fuel flow rate, the pilot fuel flow rate, the volume of air introduced by the inlet guide vane are also controlled typically by feed forward control, feed back control or PID control so as to set to predetermined values.

In this way, according to the present invention, the air flow rate controlled by the inlet guide vane 102 can be controlled based on the pressure oscillations and the acceleration oscillations measured in the gas turbine 2 so as to optimally suppress the pressure oscillations and the acceleration oscillations. Specifically, in the present invention, the generated oscillations are analyzed by dividing a frequency range into frequency bands, and appropriate correction measures are taken for each frequency band. Therefore, the efficiency of operation of the gas turbine and the stability of combustion can be improved remarkably.

(Embodiment 4)

Now, the gas turbine control apparatus for the gas turbine 2 and the gas turbine system containing the control apparatus according to the fourth embodiment of the present invention will be described below with reference to the attached drawings.

Figure 6:
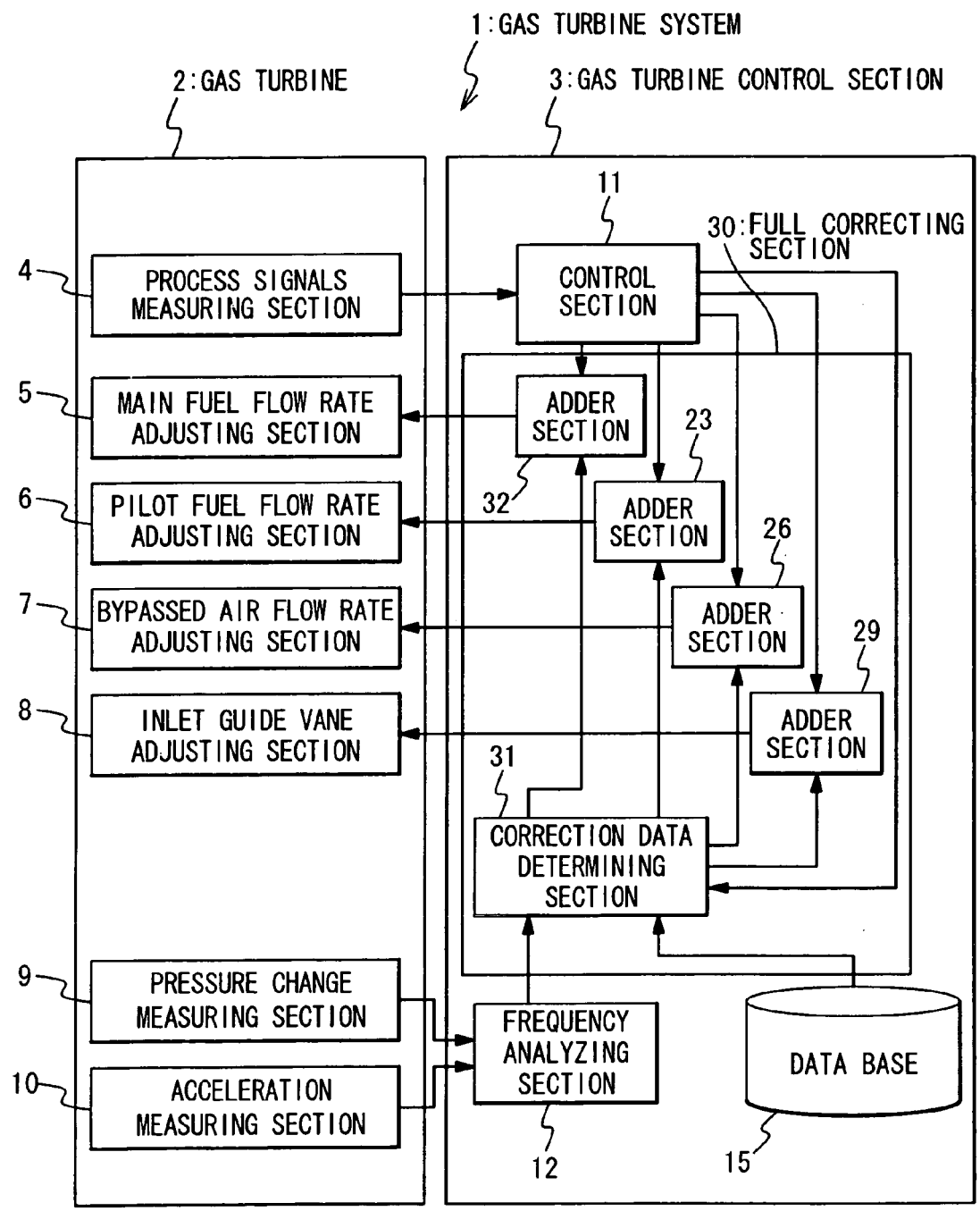
FIG. 6 is a block diagram showing the gas turbine control apparatus according to a fourth embodiment of the present invention which is used in a gas turbine system.

FIG. 6 is a schematic block diagram showing the structure of the gas turbine control apparatus and the gas turbine system according to the fourth embodiment of the present invention. The gas turbine system 1 is comprised of the gas turbine 2 and the gas turbine control section 3 as the gas turbine control apparatus of the present invention.

The gas turbine 2 is comprised of the process values measuring section 4, the main fuel flow rate adjusting section 5, the pilot fuel flow rate adjusting section 6, the bypassed air flow rate adjusting section 7, the inlet guide vane adjusting section 8, the pressure change measuring section 9 and the acceleration measuring section 10.

On the other hand, the gas turbine control section 3 is comprised of the control section 11, the frequency analyzing section 12, a data base 15 and a full correcting section 30 including a correction data determining section 31 and adder sections 23, 26, 29 and 32 and having correcting functions.

The fourth embodiment of the present invention differs from the first to third embodiments in that correction data are applied to the main fuel flow rate, the pilot fuel flow rate, the bypassed air flow rate and the inlet guide vane 102 in response to oscillations of pressure and acceleration of the gas turbine 2.

In the fourth embodiment, data are prepared on the relationship of the oscillation intensity, the second fuel flow rate of the main fuel flow rate the pilot fuel flow rate, and the second air flow rate of the bypassed air flow rate and the air flow rate from the inlet guide vane 102 in another gas turbine 2. Then, the data are compared with the data on the oscillation intensity of the currently operating gas turbine to determine the operation condition of the currently operating gas turbine 2. Thus, the flow rates are corrected based on the determined second flow rates and then the correction data is corrected. This embodiment differs from the above first through third embodiments also in these terms.

That is, the gas turbine control section 3 measures combustion oscillations produced in the gas turbine 2. Then, the gas turbine control section 3 controls the operation of the gas turbine 2 in accordance with the frequency characteristics of the combustion oscillations, more specifically by varying the main fuel flow rate, the pilot fuel flow rate, the bypassed air flow rate and the opening of the inlet guide vane in accordance with the states of oscillations. Additionally, the gas turbine control section 3 can suppress the combustion oscillations by correcting the change of the gas turbine 2 with time.

Now, the components of FIG. 6 will be described below.

The gas turbine 2 is same as the gas turbine described above for the first embodiment and hence will not be described here any further.

On the other hand, the gas turbine control section 3 controls the gas turbine 2 in accordance with the data on the process values, the pressures and the accelerations measured in the gas turbine 2 so as to stop combustion oscillations.

The control section 11 outputs control signals to the full correcting section 30 (to be described hereinafter) for controlling the main fuel flow rate adjusting section 5, the pilot fuel flow rate adjusting section 6, the bypassed air flow rate adjusting section 7 and the inlet guide vane adjusting section 8 in accordance with the data on the process values measured in the gas turbine 2. Then, the control section 11 assists the full correcting section 30 to control the main fuel flow rate adjusting section 5, the pilot fuel flow rate adjusting section 6, the bypassed air flow rate adjusting section 7 and the inlet guide vane adjusting section 8.

The frequency analyzing section 12 operates just like that of the first embodiment except that it outputs the result of analysis to the full correcting section 30.

The data base 15 of the fourth embodiment possesses data which is referred to operation-related data, on the relationship of oscillation intensity, main fuel flow rate, pilot fuel flow rate, bypassed air flow rate and air flow rate from the inlet guide vane 102 of another gas turbine 2. The data will be described with reference to FIG. 15.

Referring to FIG. 15, the frequency bands 1 to n are similar to those described above with reference to FIG. 2 or FIG. 3. The control value X represents one of the pilot fuel flow rate and the main fuel flow rate as the second flow rate, the air flow rate from the inlet guide vane 102 and the bypassed air flow rate as the second air flow rate. Thus, the data for the above listed four categories of fuel and air (main fuel, pilot fuel, bypassed air and air from the inlet guide vane 102 as elsewhere in the following) are shown in the table of FIG. 15. In FIG. 15, the columns of flow rate bands $a_1$, $a_2$, ..., $a_L$ show ranges of fuel or air flow rate. For example, $0 \leq a_1 < 5$ Nm$^3$/min., $5 \leq a_2 < 10$ Nm$^3$/min., ..., $45 \leq a_L < 50$ Nm$^3$/min. The oscillation intensity obtained as a result of analysis using new frequency bands is that of a frequency band when the gas turbine is operated with a given flow rate band. For instance, the oscillation intensity of frequency band 2 when the gas turbine is operated in the flow rate band of $a_2$ is $A_{22}$. A specific numerical value is given to the oscillation intensity.

The table of FIG. 15 is prepared based on the design data, the operation data and other data of the new gas turbine 2. Similar data are obtained by changing the flow rate values of one of the four categories of fuel and air, while fixing the values of the remaining three categories. Preferably, a number of sets of fixed values for the remaining three categories are plural, so that all operation condition may be covered by such combinations.

The full correcting section 30 calculates correction data based on the result of the frequency analysis of each frequency band for pressure or acceleration and the obtained process values. Then, the full correcting section 30 adds signals indicative of the correction data to the control signals from the control section 11 for controlling the main fuel flow rate adjusting section 5, the pilot flow rate adjusting section 6, the bypass air flow rate adjusting section 7 and the inlet guide vane adjusting section 8, and outputs the corrected control signals to those sections, respectively. The full correcting section 30 may alternatively be included in the control section 11.

The correction data determining section 31 applies the operation condition of the current gas turbine 2 to the new gas turbine 2 based on the result of the frequency analysis of each frequency band for pressure or acceleration from the frequency analyzing section 12 and the oscillation intensity data for the four categories of fuel and air contained in the data base. In other words, the correction data determining section 31 searches a set of data that match the operation condition. Then, the correction data determining section 31 determines the correction data for the main fuel flow rate adjusting section 5, the pilot flow rate adjusting section 6, the bypass air flow rate adjusting section 7 and the inlet guide vane adjusting section 8 from the correction data determining tables such as those shown in FIGS. 2 and 3 defined for the new gas turbine 2 based on the search result. The determined correction data are outputted respectively to the adder sections 23, 26, 29 and 32.

The adder sections, 23 26, 29 and 32 add the signals indicative of the respective correction data determined by the correction data determining section 31 to the corresponding control signals from the control section 11 for controlling the main fuel flow rate adjusting section 5, the pilot flow rate adjusting section 6, the bypass air flow rate adjusting section 7 and the inlet guide vane adjusting section 8, and outputs the corrected control signals respectively to the main fuel flow rate adjusting section 5, the pilot flow rate adjusting section 6, the bypass air flow rate adjusting section 7 and the inlet guide vane adjusting section 8 as control signals.

Now, the operation of the gas turbine control apparatus and the gas turbine system of the present invention will be described with reference to the drawings.

Here, the method of determining the correction data such as those shown in FIGS. 2 and 3 to be used for controlling the gas turbine in operation is same as that of the first embodiment except that it is used for the new gas turbine 2 and hence will not be described here any further. It may be appreciated that the method may be applied to a new gas turbine in Embodiment 1.

It should be noted that data shown in FIGS. 2 and 3 are prepared for each of the sections to be controlled (the main fuel flow rate adjusting section 5, the pilot fuel flow rate adjusting section 6, the bypassed air flow rate adjusting section 7, the inlet guide vane adjusting section 8) and the components (valves) thereof. In this embodiment, tables are prepared for all the sections.

Only data on pressure oscillations or on acceleration oscillations may be used for preparing a table for each of the related sections or data on both pressure oscillations and acceleration oscillations may be used for preparing a table as shown in FIG. 2 or FIG. 3.

Now the process of controlling the main fuel flow rate adjusting section 5, the pilot flow rate adjusting section 6, the bypass air flow rate adjusting section 7 and the inlet guide vane adjusting section 8 by determining respective correction data for the operation of the gas turbine 2 will be described with reference to FIGS. 6, 2, 12 and 15.

(1) Before starting an operation (the start step in FIG. 12), data shown in FIG. 2 or FIG. 3 and FIG. 15 are prepared in a manner as described above. The data are prepared for the new gas turbine 2 and stored in a storage section (not shown) of the full correcting section 30.

(2) Then, during the actual operation of the gas turbine 2, the pressure change measuring section 9 and the acceleration measuring section 10 respectively measure the pressure change of fuel gas and the acceleration in each of the combustors 111-1 to 111-m. The measured data are outputted to the frequency analyzing section 12 for each predetermined time. The output data are received by the frequency analyzing section 12 of the gas turbine control section 3 (Step S1 in FIG. 12).

(3) The frequency analyzing section 12 of the gas turbine control section 3 performs frequency analyzing operations on the measured values typically by using Fourier analysis to obtain the relationship between the frequency and the intensity (level) of oscillation as shown in FIG. 14. Thereafter, the frequency—intensity data are assigned to the predefined frequency bands (Step S2 in FIG. 12). The obtained results are then outputted to the correction data determining section 31.

(4) The correction data determining section 31 of the gas turbine control section 3 compares the result obtained for each of the frequency bands 1 to n obtained by the frequency analyzing section 12 with the data partly shown in FIG. 15 (data on the relationship of the frequency bands, the flow rate bands of air from the main fuel flow rate, the pilot flow rate, the bypass air flow rate and the inlet guide vane 102 and the oscillation intensities as stored in the data base 15, or the operation-related data). Then, the correction data determining section 31 finds out an operation condition (the flow rates of the four categories of fuel and air) where the oscillation intensities of the frequency bands and the operation-related data are coincident with each other to a satisfactory extent. The good coincidence to a satisfactory extent typically is a case of a difference of oscillation intensity within ±10%.

Subsequently, the operation condition (the flow rates of the four categories of fuel and air) is compared with the operating situation (flow rates of the four categories of fuel and air of the gas turbine 2 that is being actually driven to operate) and calculates the difference. No particular correction measure is taken if the difference is within a predetermined allowable range (e.g., ±2%).

In such a case, the correction data determining section 31 compares the oscillation intensity with each of the threshold values α of the frequency bands 1 to n in the data shown in FIG. 2 or 3 and stored in the storage section (not shown). If the intensity of oscillation does not exceed the threshold value α, correction data of 0 is selected. On the other hand, if the intensity of oscillation exceeds the threshold value α, a calculating operation of the function f is performed by using the process values outputted from the control section 11 (e.g., output power of the power generator, temperature and humidity of ambient air, a fuel flow rate and pressure in each section, an air flow rate and pressure in each section, temperature, flow rate and pressure of combustion gas in each of the combustors, the number of rotations per unit time of the compressor and that of the turbine, etc.) to determine correction data (Step S3 in FIG. 12). The determined correction data is outputted to the adder sections 23, 26, 29 and 32.

On the other hand, if the difference of any of the four categories of fuel and air exceeds the predetermined allowable range (e.g., ±2%), the flow rate of fuel or air is corrected based on the difference of flow rate. The correction data is stored in the storage section (not shown) of the correction data determining section 31, and may be used for the subsequent control operations. Also, it is possible to output the correction data to the control section 11 so that it can be used.

The subsequent process is similar to that when the flow rate does not exceed the allowable range and hence will be described here any further.

The correction data obtained from FIG. 2 or FIG. 3 is determined for each of the frequency bands 1 to n based on process values. Therefore, the difference in the flow rate of fuel or air gives rise to a difference in the correction data. For this reason, it may not be possible to accurately suppress the oscillation. However, through the above-mentioned correcting operation, it is possible to accurately determine correction data even if the difference of flow rate due to various causes including changes with time can be generated.

(5) The adder sections 23, 26, 29 and 32 of the gas turbine control section 3 add signals corresponding to the respective correction data outputted from the correction data determining section 31 to the respective control signals for controlling the main fuel flow rate adjusting section 5, the pilot fuel flow rate adjusting section 6, the bypassed air flow rate adjusting section 7 and the inlet guide vane adjusting section 8 outputted from the control section 11 to define new control signals for respectively controlling the main flow rate adjusting section 5, the pilot fuel flow rate adjusting section 6, the bypassed air flow rate adjusting section 7 and the inlet guide vane adjusting section 8 (Step S4 in FIG. 12).

(6) The gas turbine control section 3 outputs the newly defined control signals for controlling the main fuel flow rate adjusting section 5, the pilot fuel flow rate adjusting section 6, the bypassed air flow rate adjusting section 7 and the inlet guide vane adjusting section 8 to them (Step S5 in FIG. 12).

(7) The main fuel flow rate adjusting section 5, the pilot fuel flow rate adjusting section 6, the bypassed air flow rate adjusting section 7 and the inlet guide vane adjusting section 8 respectively operate appropriate any of the main fuel supply valves 115-1 to 115-m or the main fuel flow rate control valve 113; appropriate one or more of the pilot fuel supply valves 116-1 to 116-m or the pilot fuel flow rate control valve 114, any of the bypass valves 118-1 to 118-m and the inlet guide vane 102 in accordance with the control signals outputted from the adder sections 23, 26, 29 and 32.

It should be noted that the above steps of (1) through (7) are carried out repeatedly for each predetermined time during the operation of the gas turbine 2.

According to the present invention, the main fuel supply valves 115-1 to 115-m, the main fuel flow rate control valve 113, the pilot fuel supply valves 116-1 to 116-m, the pilot fuel flow rate control valve 114, the bypass valves 118-1 to 118-m and the air flow rate controlled by the inlet guide vane 102 can be controlled based on the pressure oscillations and the acceleration oscillations in the gas turbine 2 so as to optimally suppress the pressure oscillation and the acceleration oscillation. Specifically, the generated oscillations are analyzed by dividing the frequency range into frequency bands and appropriate correction measures are taken for each frequency band. Therefore, the efficiency of operation of the gas turbine and the stability of combustion can be improved remarkably.

Additionally, even if the actual flow rate of fuel or air differs from the one recognized by the control section 11 due to changes with time, the difference is corrected automatically by using the data of the data base. Therefore, combustion can be maintained for a long period of time in a stable state.

(Embodiment 5)

Now, the gas turbine control apparatus with the gas turbine 2 and the gas turbine system containing the control apparatus according to the fifth embodiment of the present invention will be described below with reference to the attached drawings.

Figure 7:
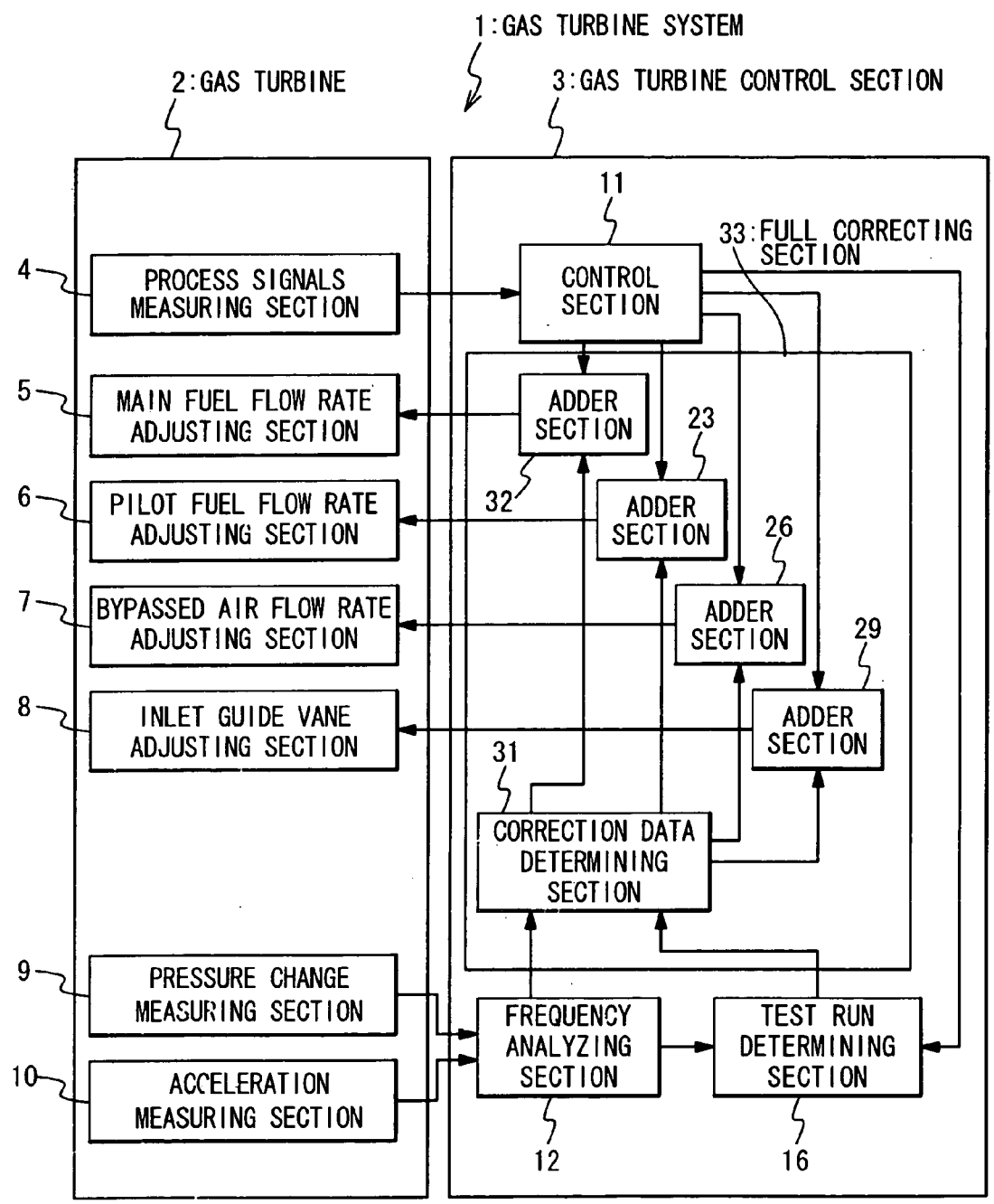
FIG. 7 is a block diagram showing the gas turbine control apparatus according to a fifth embodiment of the present invention which is used in a gas turbine system.

FIG. 7 is a block diagram showing the structure of the gas turbine control apparatus and gas turbine system according to the fifth embodiment of the present invention. The gas turbine system 1 is comprised of the gas turbine 2 and the gas turbine control section 3 as the gas turbine control apparatus of the present invention.

The gas turbine 2 is comprised of the process values measuring section 4, the main fuel flow rate adjusting section 5, the pilot fuel flow rate adjusting section 6, the bypassed air flow rate adjusting section 7, the inlet guide vane adjusting section 8, the pressure change measuring section 9 and the acceleration measuring section 10.

On the other hand, the gas turbine control section 3 is comprised of the control section 11, the frequency analyzing section 12, a test run determining section 16, a correction data determining section 31 and a full correcting section 33 including adder sections 23, 26, 29 and 32 and having correcting functions.

This embodiment of the present invention differs from the first through third embodiments in that correction data are applied to the main fuel flow rate, the pilot fuel flow rate, the bypassed air flow rate and the inlet guide vane 102 in response to oscillations of pressure and acceleration of the gas turbine 2.

Also, this embodiment of the present invention differs from the first through third embodiments in that a part of the operation condition is gradually changed in the gas turbine 2 on the operation and the relationship between the oscillation intensity and the adjusted operation condition is determined, and then optimal operation condition, in which the oscillation intensity is minimized, are determined as the result of change of a plurality of operation condition.

In other words, the gas turbine control section 3 knows the combustion oscillation produced in the gas turbine 2. Then, in this embodiment, the operation of the gas turbine 2 is appropriately controlled in accordance with the frequency characteristics of the combustion oscillation, e.g., the states of the main fuel flow rate, the pilot fuel flow rate, the bypassed air flow rate and the inlet guide vanes are properly changed in accordance with to the oscillation. The operation condition in which the combustion oscillation is minimized is automatically found. Thus, it is possible to suppress the combustion oscillation.

Now, the components of FIG. 7 will be described below.

The gas turbine 2 is same as the gas turbine of the first embodiment and hence will not be described here any further.

On the other hand, the gas turbine control section 3 controls the gas turbine 2 in accordance with the process values, the pressures and the accelerations measured in the gas turbine 2 so as to stop combustion oscillations.

The control section 11 outputs control signals to the full correcting section 33 (to be described hereinafter) for controlling the main fuel flow rate adjusting section 5, the pilot fuel flow rate adjusting section 6, the bypassed air flow rate adjusting section 7 and the inlet guide vane adjusting section 8 in accordance with the process values measured in the gas turbine 2, and assists the full correcting section 30 to control the main fuel flow rate adjusting section 5, the pilot fuel flow rate adjusting section 6, the bypassed air flow rate adjusting section 7 and the inlet guide vane adjusting section 8.

The frequency analyzing section 12 operates just like that of the first embodiment except that it outputs the result of analysis to the full correcting section 30.

The test run determining section 16 in this embodiment changes the operation condition for the gas turbine 2 in the currently operating state, e.g., the opening angles of the main fuel supply valves 115-1 to 115-m, the main fuel flow rate control valve 113, the pilot fuel supply valves 116-1 to 116-m, and the pilot fuel flow rate control valve 114 and the bypass valves 118-1 to 118-m and the angle of the inlet guide vane 102 to find out operation condition that minimize the oscillation intensity, carries out the test run of the gas turbine 2 and determines the operation condition. The change, determination and execution of the operation condition will be described below.

Figure 8:
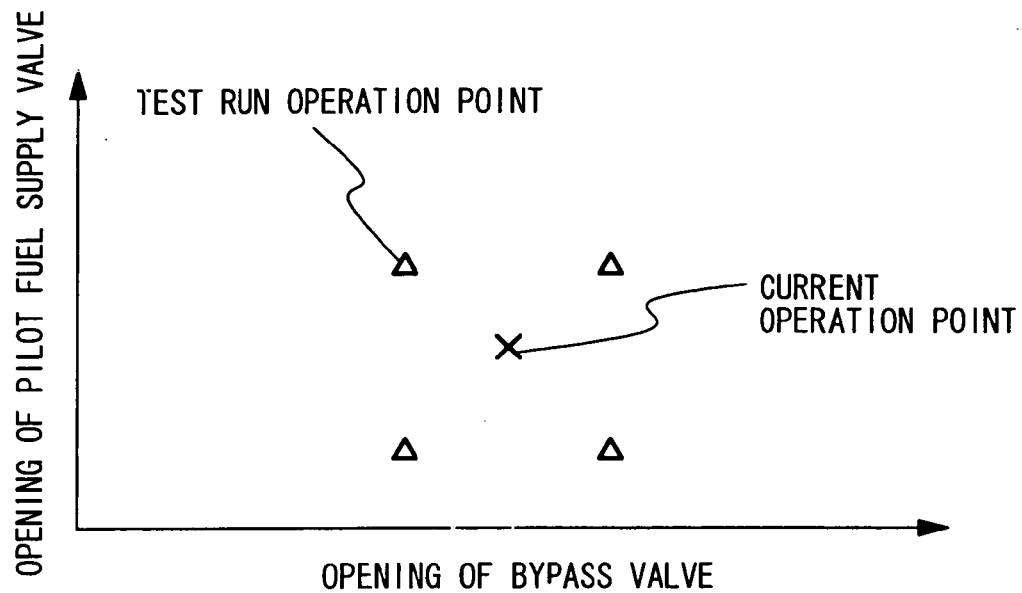
FIG. 8 is a diagram showing test run points of the gas turbine control apparatus in the fifth embodiment of the present invention.

In FIG. 8, the horizontal axis represents the opening of the bypass valves 118-1 to 118-m and the vertical axis represents the opening of the pilot fuel supply valves 116-1 to 116-m. When the gas turbine 2 is currently operated under the conditions indicated by x in FIG. 8, the operation condition indicated by Δ s (four points) may be selected for a test run. The difference between the current operation condition and those of the test run is limited to be less than a predetermined value for each parameter (e.g., ±2% of the flow rate). The test run determining section 16 determines the difference for each parameter (e.g., ±0.01 Nm³/min. for flow rate) and outputs the determined difference values to the correction data determining section 31.

The full correcting section 33 calculates the correction data based on the result of the frequency analysis of each frequency band for pressure or acceleration and the obtained process values. Then, signals corresponding to the correction data are added to the control signals from the control section 11 for controlling the main fuel flow rate adjusting section 5, the pilot flow rate adjusting section 6, the bypass air flow rate adjusting section 7 and the inlet guide vane adjusting section 8, and the corrected control signals are outputted to those sections. The full correcting section 33 may alternatively be included in the control section 11.

The correction data determining section 31 determines correction data that can realize the difference values from the test run determining section 16 and outputs those values to the adder sections 23, 26, 29 and 32. It should be noted that in this embodiment, the change of the operation condition based on the result of the frequency analysis from the frequency analyzing section 12 as described above with reference to the first to third embodiments are temporarily suspended.

The adder sections 23, 26, 29 and 32 add the signals corresponding to the correction data determined by the correction data determining section 31 to the corresponding control signals from the control section 11 for controlling the main fuel flow rate adjusting section 5, the pilot flow rate adjusting section 6, the bypass air flow rate adjusting section 7 and the inlet guide vane adjusting section 8, and outputs the corrected control signals respectively to the main fuel flow rate adjusting section 5, the pilot flow rate adjusting section 6, the bypass air flow rate adjusting section 7 and the inlet guide vane adjusting section 8 as control signals.

Now, the operation of this embodiment of gas turbine control apparatus and gas turbine system will be described with reference to the drawings.

Figure 16:
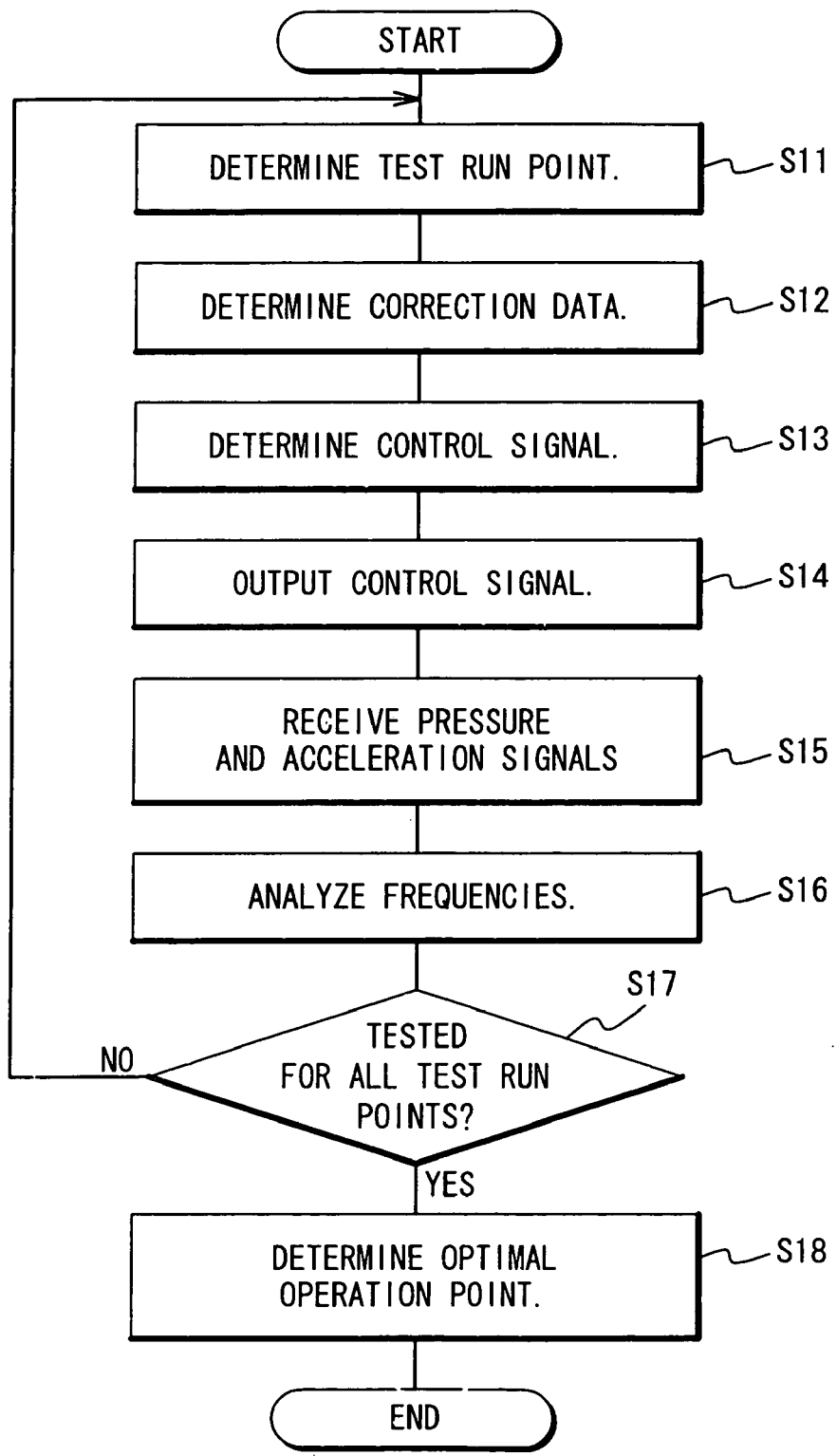
FIG. 16 is a flow chart showing an operation of a gas turbine control apparatus of the present invention.

(1) The gas turbine 2 in this embodiment is operated as in the first to third embodiments under the conditions indicated by x in FIG. 8 (the start step in FIG. 16).

(2) Next, the test run points determining section 16 determines operation condition indicated by Δs in FIG. 8 (to be referred to as test run points) that are slightly shifted from the point indicated by x in FIG. 8. Then, the test run points determining section 16 outputs the differences between the test run points and the current operation condition, i.e., the differences between the current openings of the bypass valves 118 and the pilot fuel supply valves 116 and their openings at the test run points, to the correction data determining section 31 (Step S11 in FIG. 16).

(3) The correction data determining section 31 converts the differences of operation condition from the test run points determining section 16 into correction data and finalizes them (Step S12 in FIG. 16). The finalized correction data are outputted respectively to the adder sections 23, 26, 29 and 32.

(4) The adder sections 23, 26, 29 and 32 of the gas turbine control section 3 add signals corresponding to the correction data outputted from the correction data determining section 31 to the respective control signals for controlling the main fuel flow rate adjusting section 5, the pilot fuel flow rate adjusting section 6, the bypassed air flow rate adjusting section 7 and the inlet guide vane adjusting section 8 outputted from the control section 11 to define new control signals for respectively controlling the main flow rate adjusting section 5, the pilot fuel flow rate adjusting section 6, the bypassed air flow rate adjusting section 7 and the inlet guide vane adjusting section 8 (Step S13 in FIG. 16).

(5) The gas turbine control section 3 outputs the newly defined control signal to the main flow rate adjusting section 5, the pilot fuel flow rate adjusting section 6, the bypassed air flow rate adjusting section 7 and the inlet guide vane adjusting section 8 for the control (Step S14 in FIG. 16).

(6) The main fuel flow rate adjusting section 5, the pilot fuel flow rate adjusting section 6, the bypassed air flow rate adjusting section 7 and the inlet guide vane adjusting section 8 respectively operate appropriate one or more of the main fuel supply valves 115-1 to 115-m or the main fuel flow rate control valve 113, appropriate one or more of the pilot fuel supply valves 116-1 to 116-m or the pilot fuel flow rate control valve 114, appropriate one or more of the bypass valves 118-1 to 118-m and the inlet guide vane 102 in accordance with the control signal.

As a result of the operation, the operation condition of the gas turbine 2 are adjusted to change the oscillation intensity.

The pressure change measuring section 9 and the acceleration measuring section 10 measure respectively the pressure change of combustion gas in each of the combustors 111-1 to 111-m and the acceleration of each of the combustors 111-1 to 111-m. The measured data are outputted to the frequency analyzing section 12. The output data are received by the frequency analyzing section 12 of the gas turbine control section 3 (Step S15 in FIG. 16).

(7) The frequency analyzing section 12 of the gas turbine control section 3 performs frequency analyzing operations on the measured data typically by using Fourier analysis to obtain the relationship between the frequency and the intensity (level) of oscillation as shown in FIG. 14. Thereafter, the frequency—intensity are assigned to the predefined frequency bands (Step S16 in FIG. 16). The obtained results are then outputted to the test run points determining section 16.

(8) The above steps of (1) through (7) are repeated for the selected number of test run points (Step S17 in FIG. 16).

(9) After the operation and the frequency analysis are concluded for each of the test run points, the test run points determining section 16 determines the optimal operating point.

The process of determining the optimal operating point will be described with reference to FIG. 9.

Figure 9:
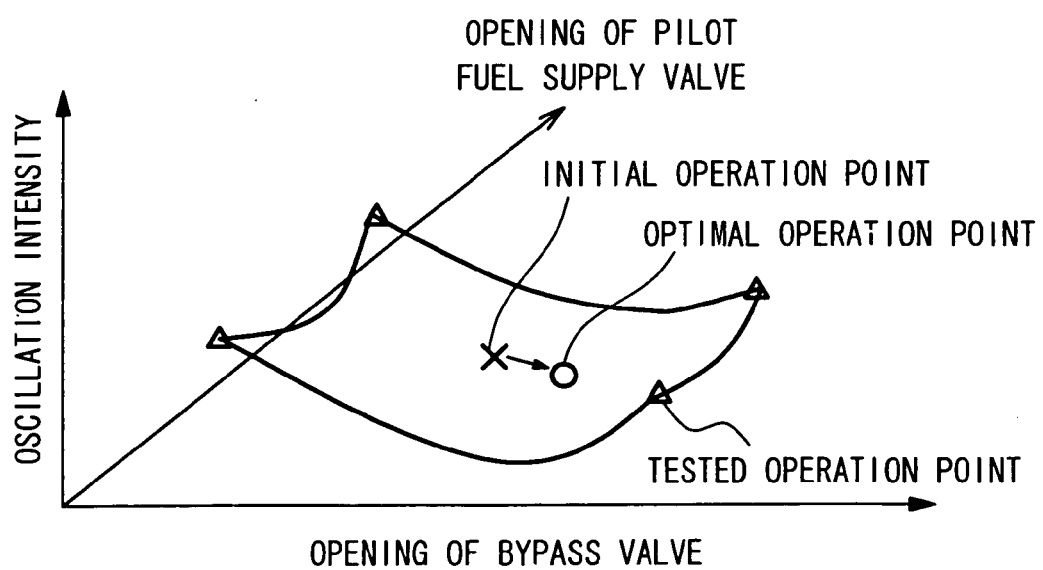
FIG. 9 is a diagram illustrating a process of determining an optimal operation point in the gas turbine control apparatus of the present invention.

In FIG. 9, the horizontal axis represents the opening of the bypass valves 118-1 to 118-m and the vertical axis represents the oscillation intensity obtained as the result of frequency analysis. In FIG. 9, x indicates the oscillation intensity in the initial operation condition of the gas turbine 2 before any test run point operation is conducted and Δ s indicate the respective oscillation intensities in the operation condition for the test run points. The curves connecting the Δs respectively represent the curved surface predicted based on the measured data at the points Δ and the point x. An optimal point indicated by ○ is determined from the limits in change range of the opening of the bypass valves 118-1 to 118-m determined by the other operation condition and the result of the test runs shown in FIG. 9 (Step S18 in FIG. 16).

Finally, the operation condition is corrected so as to match the determined optimal point.

In this way, the gas turbine control apparatus finds out operation condition that can minimize oscillations by test runs. Therefore, the gas turbine can be driven to operate with suppressed oscillations and stable combustion in order to prolong the service life of the gas turbine and reduce the maintenance cost.

If the actual flow rates of fuel and air is different from the values recognized by the control section 11 due to change with time, an optimal operating point is detected by test runs to improve the operation condition so that the influence of time can be minimized.

(Embodiment 6)

Now, gas turbine remote monitoring system with the gas turbine according to the sixth embodiment of the present invention will be described below with reference to the drawings.

Figure 10:
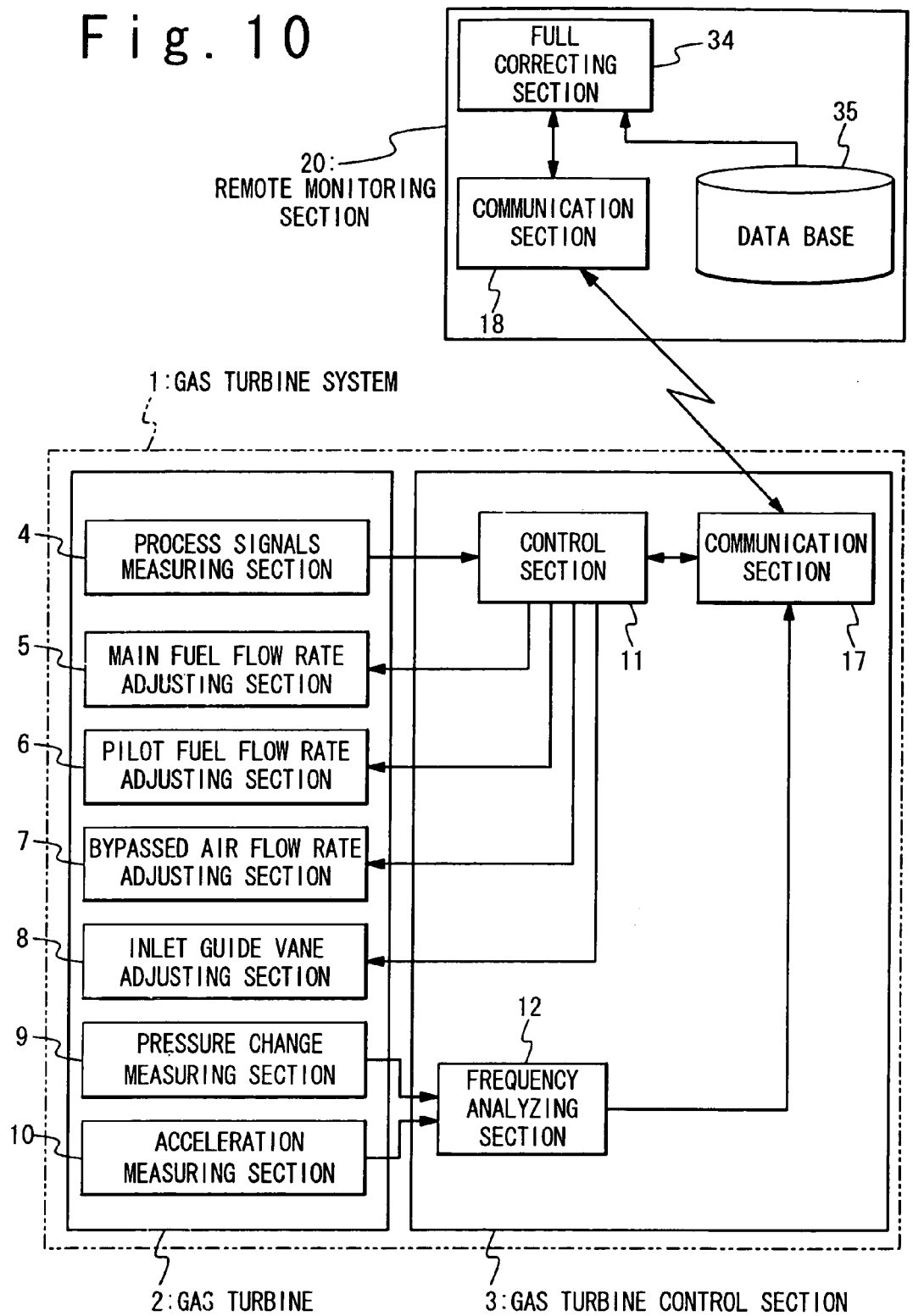
FIG. 10 is a block diagram showing the system configuration of a gas turbine remote monitoring system of the present invention.

FIG. 10 is a block diagram showing the structure of the gas turbine remote monitoring system according to this embodiment of the present invention. The gas turbine remote monitoring system is comprised of the gas turbine system 1 and a remote monitoring section 20. The gas turbine system 1 is comprised of the gas turbine 2 and the gas turbine control section 3 as a gas turbine control apparatus of the present invention.

The gas turbine 2 is comprised of the process values measuring section 4, a main fuel flow rate adjusting section 5, the pilot fuel flow rate adjusting section 6, the bypassed air flow rate adjusting section 7, the inlet guide vane adjusting section 8, the pressure change measuring section 9 and the acceleration measuring section 10.

On the other hand, the gas turbine control section 3 is comprised of the control section 11, the frequency analyzing section 12 and a communication section 17.

The remote monitoring section 20 is comprised of a data base 35, a full correcting section 34 and a communication section 18. That is, of the full correcting section 30, a first correcting function, which determines correction data, is applied to the full correcting section 34. A second correcting function, which controls the gas turbine 2 based on the determined correction data and the control signals, is applied to the control section 11. However, this function may be achieved as a unit like the correction section 21 in the first embodiment.

This embodiment of the present invention differs from the first through fourth embodiments in that the remote monitoring section 20 deals with pressure oscillations and acceleration oscillations of the gas turbine 2. More specifically, the remote monitoring section 20 obtains data on the oscillations in the gas turbine 2 from the gas turbine control section 3 via a communication line. The full correcting section 34 determines correction data for the control signals in the main fuel flow rate, the pilot fuel flow rate, the bypassed air flow rate and the inlet guide vane 102 with reference to the received oscillation data and the data stored in the data base 35. Then, the oscillations are suppressed by transmitting commands to the gas turbine control section 3 by the communication line.

More specifically, the remote monitoring section 20 knows the combustion oscillation produced in the gas turbine 2 by communication with the gas turbine control section 3. Then, the remote monitoring section 20 transmits signals for appropriately controlling the operation of the gas turbine 2 in accordance with the frequency characteristics of the combustion oscillation, more specifically, the main fuel flow rate, the pilot fuel flow rate, the bypassed air flow rate and the opening of the inlet guide vane in accordance with the condition of oscillation. As a result, the combustion oscillations can be suppressed remotely.

Now, the components of FIG. 10 will be described below.

The gas turbine 2 is same as the gas turbine described above for the first embodiment and hence will not be described here any further.

On the other hand, the gas turbine control section 3 controls the gas turbine 2 in accordance with the process values, the pressures and the accelerations measured in the gas turbine 2 so as to stop combustion oscillations.

The control section 11 transmits the process values (operation situation data) to the remote monitoring section 20 via the communication section 17 and receives control signals from the remote monitoring section 20 via the communication section 17. The control section 11 has therein the adders 23, 26, 29 and 32 in the fourth embodiment and synthetically adds or combines the control signals from the remote monitoring section 20 and the corresponding ordinary control signals. Then, the control section 11 outputs the combined control signals for controlling the main fuel flow rate adjusting section 5, the pilot fuel flow rate adjusting section 6, the bypassed air flow rate adjusting section 7 and the inlet guide vane adjusting section 8 so as to properly control them.

The frequency analyzing section 12 operates just like that of the first embodiment except that the frequency analyzing section 12 outputs the result of analysis to the remote monitoring section 20 via the communication section 17 and hence will be note described here any further.

The communication section 17 is connected to the control section 11 and the frequency analyzing section 12 in the gas turbine control section 3. The communication section 17 is also connected to the remote monitoring section 20 via a communication line, which may be a radio line and/or a wired line.

The remote monitoring section 20 monitors the combustion oscillations produced in the gas turbine 2 by communications from the gas turbine control section 3. Then, the remote monitoring section 20 transmits signals for appropriately controlling the operation of the gas turbine 2 based on the frequency characteristics of the oscillations and suppresses the combustion oscillations. The remote monitoring section 20 may not be necessarily dedicated to a single gas turbine 2. The remote monitoring section 20 may be commonly used for a number of gas turbines to improve the efficiency of monitoring operations.

The data base 35 in this embodiment that is a remote data base is essentially same as the data base 15 of the fourth embodiment and hence will not be described here any further.

The full correcting section 34 calculates correction data in the same manner as the fourth embodiment based on the result of the frequency analysis of each frequency band for pressure or acceleration, the obtained process values and the oscillation intensity for the four categories of fuel and air contained in the data base 35. Then, the full correcting section 34 outputs the correction data to be respectively added to the control signals from the control section 11 for controlling the main fuel flow rate adjusting section 5, the pilot flow rate adjusting section 6, the bypass air flow rate adjusting section 7 and the inlet guide vane adjusting section 8 to the gas turbine control section 3 by the communication section 18. The full correcting section 34 includes therein the function of the correction data determining section 31 of the fourth embodiment.

Now, the operation of the gas turbine control apparatus and gas turbine system of the present invention will be described with reference to the drawing.

Here, the method of determining the correction data such as those shown in FIGS. 2 and 3 are same as those of the fourth embodiment and hence will not be described here any further.

It should be noted that data as shown in FIGS. 2 and 3 are prepared for each of the sections to be controlled (the main fuel flow rate adjusting section 5, the pilot fuel flow rate adjusting section 6, the bypassed air flow rate adjusting section 7, the inlet guide vane adjusting section 8) and the components (valves). In this embodiment, the data are prepared for all the sections.

Only data on pressure oscillations or on acceleration oscillations may be used for preparing the above data as shown in FIG. 2 or FIG. 3 or data on both pressure oscillations and acceleration oscillations may be used for preparing the data as shown in FIG. 2 or FIG. 3.

Now the process of controlling the main fuel flow rate adjusting section 5, the pilot flow rate adjusting section 6, the bypass air flow rate adjusting section 7 and the inlet guide vane adjusting section 8 by determining respective correction data for the operation of the gas turbine 2 will be described with reference to FIGS. 10, 2, and 15.

(1) Before starting an operation, the data as shown in FIG. 2 or FIG. 3 and FIG. 15 are prepared in a manner as described above. The data are prepared for the new gas turbine 2 and stored in a storage section (not shown) of the full correcting section 34.

(2) Then, during the actual operation of the gas turbine 2, the pressure change measuring section 9 and the acceleration measuring section 10 respectively measure the pressure change of combustion gas in each of the combustors 111-1 to 111-m and the acceleration of each of the combustors 111-1 to 111-m. The measured data are outputted to the frequency analyzing section 12 for each predetermined time. The output data are received by the frequency analyzing section 12 of the gas turbine control section 3.

(3) The frequency analyzing section 12 of the gas turbine control section 3 performs a frequency analyzing operation on the measured data by using Fourier analysis typically to obtain the relationship between the frequency and the intensity (level) of oscillation as shown in FIG. 14. Thereafter, the data are assigned to the predefined frequency bands. The obtained results are then outputted to the remote monitoring section 20 via the communication section 17 and the communication line.

(4) The full correcting section 34 of the remote monitoring section 20 compares the result obtained for each of the frequency bands 1 to n obtained by the frequency analyzing section 12 with the data partly shown in FIG. 15, data on the relationship of the frequency bands, the flow rate bands of air from the main fuel flow rate, the pilot flow rate, the bypass air flow rate and the inlet guide vane 102 and the oscillation intensities stored in the data base 35, or the operation-related data. Then, the full correcting section 34 finds out an operation condition, the flow rates of the four categories of fuel and air, where the oscillation intensities of the frequency bands and the operation-related data are coincident with each other to a satisfactory extent. The coincidence to a satisfactory extent means a difference of oscillation intensity within ±10%.

Subsequently, the operation condition (the flow rates of the four categories of fuel and air) is compared with flow rates of the four categories of fuel and air of the gas turbine 2 being actually driven to operate and the difference is calculated. No particular measure will be taken if the difference is within a predetermined allowable range (e.g., ±2%) In such a case, the full correcting section 34 compares the oscillation intensity with each of the threshold values α of the frequency bands 1 to n in the data shown in FIG. 2 or 3 and stored in a storage section (not shown). If the intensity of oscillation does not exceed the threshold value α, the correction data of 0 is selected.

On the other hand, if the intensity of oscillation exceeds the threshold value α, a calculating operation is performed on the function f by using the process values outputted from the control section 11 (e.g., output power of the power generator, temperature and humidity of ambient air, the fuel flow rate and pressure in each section, the air flow rate and pressure in each section, temperature, flow rate, and pressure of combustion gas in each of the combustors, number of rotations per unit time of the compressor and that of the turbine, etc.) to determine the correction data. The determined correction data is outputted to the gas turbine control section 3 via the communication section 18 and the communication line.

On the other hand, if the difference of any of the four categories of fuel and air exceeds the predetermined allowable range (e.g., ±2%), the flow rate of fuel or air is corrected based on the difference of flow rate. The correction data is stored in a storage section (not shown) of the full correcting section 34. Thereafter, the correction data may be used for the subsequent control operations. It is also possible to output the correction data to the control section 11 so that the correction data is used.

The subsequent procedures are similar to those that are followed when the flow rate does not exceed the allowable range and hence will be described here any further.

The correction data obtained from FIG. 2 or FIG. 3 is determined for each of the frequency bands 1 to n based on process values. Therefore, the difference in the flow rate of fuel or air gives rise to a difference in the correction data. For this reason, it may not be possible to accurately suppress the oscillation. However, through the above-mentioned correcting procedures, it is possible to accurately determine the correction data even if the difference of flow rate is produced due to various causes including changes with time.

(5) The control section 11 of the gas turbine control section 3 adds signals corresponding to the respective correction data outputted from the full correcting section 34 to the respective control signals for controlling the main fuel flow rate adjusting section 5, the pilot fuel flow rate adjusting section 6, the bypassed air flow rate adjusting section 7 and the inlet guide vane adjusting section 8 outputted from the control section 11 to define new control signals for respectively controlling the main flow rate adjusting section 5, the pilot fuel flow rate adjusting section 6, the bypassed air flow rate adjusting section 7 and the inlet guide vane adjusting section 8.

(6) The gas turbine control section 3 outputs the newly defined control signal for controlling the main fuel flow rate adjusting section 5, the pilot fuel flow rate adjusting section 6, the bypassed air flow rate adjusting section 7 and the inlet guide vane adjusting section 8 to them.

(7) The main fuel flow rate adjusting section 5, the pilot fuel flow rate adjusting section 6, the bypassed air flow rate adjusting section 7 and the inlet guide vane adjusting section 8 respectively operate appropriate one or more of the main fuel supply valves 115-1 to 115-m or the main fuel flow rate control valve 113, appropriate one or more of the pilot fuel supply valves 116-1 to 116-m or the pilot fuel flow rate control valve 114, appropriate one or more of the bypass valves 118-1 to 118-m and the inlet guide vane 102 in accordance with the control signal outputted from the control section 11.

It should be noted that the above steps of (1) through (7) are carried out repeatedly for each predetermined time during the operation of the gas turbine 2.

In this way, according to the gas turbine remote monitoring system of the present invention, it is now possible to remotely monitor the operation condition of the gas turbine 2 and to cope with an undesired condition of the gas turbine 2 such as combustion oscillations from a remote site. The remote monitoring section may not be necessarily dedicated to a single gas turbine. It may be commonly used for a number of gas turbines to centrally monitor the gas turbines and to control any of them whenever necessary. Thus, the control systems of a number of plants can be controlled with ease to improve the efficiency of monitoring operations and reduce the management cost.

According to the present invention, it is now possible to change the operation condition of the gas turbine depending on its current operation state. Particularly, it is possible to suppress the combustion oscillations produced in the gas turbine and to improve the combustion stability. Then, the reliability of the operation of the gas turbine and the cost of running it can be significantly reduced.

What is claimed is:

1. A gas turbine control method, comprising:
receiving a measurement data of at least one of a pressure or acceleration oscillations in at least one combustor of a gas turbine;
frequency analyzing said measurement data to produce a frequency analysis result;
dividing said frequency analysis result into a plurality of frequency bands;
determining a correction data to at least one of a first flow rate of fuel or a first flow rate of air to be supplied to said gas turbine based on said frequency analysis result and threshold values for said plurality of frequency bands; and
controlling said gas turbine based on process data indicating an operation state of said gas turbine and said correction data.

2. The gas turbine control method according to claim 1, wherein said determining further comprises, when the frequency analysis result shows that an intensity of the oscillations exceeds a threshold value in any of said plurality of frequency bands as an abnormal frequency band, determining a correction data for an abnormal frequency band based on said abnormal frequency band and said process data, and said controlling further comprises controlling the at least one of said first fuel flow rate or said first air flow rate based on said correction data for an abnormal frequency.

3. The gas turbine control method according to claim 2, further comprising:
providing a data base with sets of at least one of a second fuel flow rate or a second air flow rate for another gas turbine and a second frequency analysis result for frequency bands for acceleration oscillation of said another gas turbine, wherein said determining correction data to said at least one of said first fuel flow rate or said first air flow rate is based on at least one of said second fuel flow rate or said second air flow rate and on said second frequency analysis result.

4. The gas turbine control method according to claim 1, wherein said fuel flow rate comprises at least one of a flow rate of main fuel or a flow rate of pilot fuel.

5. The gas turbine control method according to claim 1, wherein said first air flow rate comprises at least one of a flow rate of bypassed air of said gas turbine or a flow rate of air adjusted by an inlet guide vane.

6. A gas turbine control method, comprising:
receiving a measurement data of acceleration oscillations in at least one combustor of a gas turbine;
frequency analyzing said measurement data to produce a frequency analysis result;
dividing said frequency analysis result into a plurality of frequency bands;
determining a correction data to at least a flow rate of air to be supplied to said gas turbine based on said frequency analysis result and threshold values for said plurality of frequency bands; and
controlling said gas turbine based on process data indicating an operation state of said gas turbine and said correction data.

7. The gas turbine control method according to claim 6, wherein the receiving further comprises receiving a measurement data of pressure oscillations in the at least one combustor of the gas turbine.

8. The gas turbine control method according to claim 6, wherein the determining further comprises determining a correction data to a flow rate of fuel to be supplied to said gas turbine based on said frequency analysis result and threshold values for said plurality of frequency bands.

9. A storage medium for storing a computer readable program for controlling a gas turbine, which when executed by a computer causes the computer to perform:
   instructions for receiving a measurement data of at least one of a pressure or acceleration oscillations in at least one combustor of a gas turbine;
   instructions for frequency analyzing said measurement data to produce a frequency analysis result;
   instructions for dividing said frequency analysis result into a plurality of frequency bands;
   instructions for determining a correction data to at least one of a first flow rate of fuel or a first flow rate of air to be supplied to said gas turbine based on said frequency analysis result and threshold values for said plurality of frequency bands; and
   instructions for controlling said gas turbine based on process data indicating an operation state of said gas turbine and said correction data.

10. The storage medium according to claim 9, wherein said instructions for determining further comprises, when the frequency analysis result shows that an intensity of the oscillations exceeds a threshold value in any of said plurality of frequency bands as an abnormal frequency band, instructions for determining a correction data for an abnormal frequency band based on said abnormal frequency band and said process data, and said controlling further comprises controlling the at least one of said first fuel flow rate or said first air flow rate based on said correction data for an abnormal frequency.

11. The storage medium according to claim 10, further comprising:
   instructions for providing a data base with sets of at least one of a second fuel flow rate or a second air flow rate for another gas turbine and a second frequency analysis result for frequency bands for acceleration oscillation of said another gas turbine, wherein said instructions for determining correction data to said at least one of said first fuel flow rate or said first air flow rate is based on at least one of said second fuel flow rate or said second air flow rate and on said second frequency analysis result.

12. The storage medium according to claim 9, wherein said fuel flow rate comprises at least one of a flow rate of main fuel or a flow rate of pilot fuel.

13. The storage medium according to claim 9, wherein said first air flow rate comprises at least one of a flow rate of bypassed air of said gas turbine or a flow rate of air adjusted by an inlet guide vane.

14. A storage medium for storing a computer readable program for controlling a gas turbine, which when executed by a computer causes the computer to perform:
   instructions for receiving a measurement data of acceleration oscillations in at least one combustor of a gas turbine;
   instructions for frequency analyzing said measurement data to produce a frequency analysis result;
   instructions for dividing said frequency analysis result into a plurality of frequency bands;
   instructions for determining a correction data to at least a flow rate of air to be supplied to said gas turbine based on said frequency analysis result and threshold values for said plurality of frequency bands; and
   instructions for controlling said gas turbine based on process data indicating an operation state of said gas turbine and said correction data.

15. The storage medium according to claim 14, wherein the instructions for receiving further comprises instructions for receiving a measurement data of pressure oscillations in the at least one combustor of the gas turbine.

16. The storage medium according to claim 14, wherein the instructions for determining further comprises instructions for determining a correction data to a flow rate of fuel to be supplied to said gas turbine based on said frequency analysis result and threshold values for said plurality of frequency bands.

* * * * *